(12) United States Patent
Rivera

(10) Patent No.: US 12,583,254 B2
(45) Date of Patent: Mar. 24, 2026

(54) SYSTEM AND METHOD FOR WHEEL REPLACEMENT IN A VEHICLE

(71) Applicant: Paul Rivera, West Haven, CT (US)

(72) Inventor: Paul Rivera, West Haven, CT (US)

(73) Assignee: Paul Rivera, West Haven, CT (US)

( * ) Notice: Subject to any disclaimer, the term of this patent is extended or adjusted under 35 U.S.C. 154(b) by 0 days.

(21) Appl. No.: 18/776,376

(22) Filed: Jul. 18, 2024

(65) Prior Publication Data

US 2024/0367459 A1     Nov. 7, 2024

Related U.S. Application Data

(60) Continuation-in-part of application No. 17/346,230, filed on Jun. 12, 2021, now Pat. No. 12,043,061, which is a division of application No. 16/561,664, filed on Sep. 5, 2019, now Pat. No. 11,059,324, which is a continuation-in-part of application No. 15/901,536, filed on Feb. 21, 2018, now Pat. No. 10,875,150, which is a continuation-in-part of application No. 14/858,037, filed on Sep. 18, 2015, now abandoned.

(51) Int. Cl.
| | |
|---|---|
| *B60B 29/00* | (2006.01) |
| *B60S 5/00* | (2006.01) |
| *B60S 9/02* | (2006.01) |

(52) U.S. Cl.
CPC ............... *B60B 29/00* (2013.01); *B60S 5/00* (2013.01); *B60S 9/02* (2013.01)

(58) Field of Classification Search
CPC .......... B60B 3/14; B60B 3/142; B60B 3/145; B60B 3/147; B60B 3/16; B60B 3/165; B60B 3/18; B60B 27/065; B60B 13/18; B60B 2900/521; B60B 2340/50; B60B 29/006; B60B 29/00
USPC ...... 301/35.52, 116, 111.03, 111.01, 35.621, 301/35.63, 35.622
See application file for complete search history.

(56) References Cited

U.S. PATENT DOCUMENTS

| | | | | |
|---|---|---|---|---|
| 2,191,081 A | * | 2/1940 | Menken .................... | B60B 3/18 301/35.52 |
| 2,289,448 A | * | 7/1942 | Monroe .................... | B60B 3/18 301/35.61 |
| 2,490,486 A | * | 12/1949 | Spurlock .................. | B60B 3/18 301/9.1 |
| 2,669,486 A | * | 2/1954 | Fernandez ................ | B60B 3/18 301/35.52 |

(Continued)

*Primary Examiner* — Jason L Vaughan
(74) *Attorney, Agent, or Firm* — Wiggin and Dana LLP

(57) ABSTRACT

In a system and method for replacing a vehicle wheel an electric motor with a drive shaft is concentrically connected to a first gear. The first gear may connect to a symmetrical bolt locking gear array having several bolt locking gears arranged such that each bolt locking gear rotates in the same direction that the first gear rotates. Each bolt locking gear may have a cylindrical hole at its center. The cylindrical hole may be outlined with an inner spiral thread, which connects to a set of power bolts that are outlined in an outer spiral thread which interlocks with the inner spiral thread. A power jack system having a plurality of extendable and collapsible bases is provided in the undercarriage of the vehicle to raise and lower the vehicle. An app running on a mobile device may control the raising/lowering of the vehicle and tightening/loosening of the power bolts.

8 Claims, 21 Drawing Sheets

(56)                    References Cited

U.S. PATENT DOCUMENTS

| | | | | | |
|---|---|---|---|---|---|
| 2,829,725 A | * | 4/1958 | Wurdelman | .......... | B60B 35/121 180/340 |
| 3,073,650 A | * | 1/1963 | Holbrow | ................... | B60B 3/18 301/35.52 |
| 3,390,916 A | * | 7/1968 | Shelton | .................... | B60B 3/18 301/9.1 |
| 10,207,538 B2 | * | 2/2019 | Black | ...................... | B25B 23/18 |
| 11,518,008 B2 | * | 12/2022 | McPhee | ................. | F16B 31/04 |

* cited by examiner

THREADED 1/2" X20 LUGNUT-GEAR 59T (716,728,730)

GEAR AND SHAFT ARE NOT CONNECTED HERE

PRIMARY DRIVE GEAR 34T (704,708,712)

1 (ORDER OF GEARS)

724

FIRST TRANSMISSION GEAR 60T (736)

718

726

2

SECOND TRANSMISSION GEAR 28T (744)

3

740

OUTPUT GEARS 55T (746)

4

742

MOMENTARY IMPACT DRIVER UNIT

730

717

SECONDARY DRIVE GEAR 25T (715)
BEGIN MOMENTARY IMPACT ROTATION

5

700

6

7

IDLER GEARS (714)
X4

732

721

702

758

SYSTEM AND METHOD FOR WHEEL REPLACEMENT IN A VEHICLE

CROSS-REFERENCE TO RELATED APPLICATIONS

This patent application is a continuation-in-part of U.S. patent application Ser. No. 17/346,230 titled "Electrically Actuated Apparatus and Method for Tire Replacement" filed on Jun. 12, 2021; which is a divisional of U.S. patent application Ser. No. 16/561,664 titled "Electrically Actuated Apparatus and Method for Tire Replacement" and filed on Sep. 5, 2019 and now issued as U.S. Pat. No. 11,059,324; which is a continuation-in-part of U.S. patent application Ser. No. 15/901,536 titled "Apparatus and Method for Automatic Tire Replacement," filed on Feb. 21, 2018 and now issued as U.S. Pat. No. 10,875,150; and which is a continuation-in-part of U.S. patent application Ser. No. 14/858,037, titled "Automatic All Wheel Hydraulic Power Jack System," filed on Sep. 18, 2015 and now abandoned. The disclosures of U.S. Ser. Nos. 17/346,230, 16/561,664, 15/901,536, and U.S. Ser. No. 14/858,037 are incorporated by reference herein in their entireties.

BACKGROUND OF THE DISCLOSURE

Most motorists readily acknowledge that changing a flat tire along the roadside can be a difficult and time-consuming operation. The motorist may have to contend with freezing rain, darkness, and an unstable or wet ground surface to support a portable jack, and insufficient room to completely pull the car off the road. Not only do these conditions make it difficult to change a flat tire, but they may also pose a safety hazard to the stopped motorist.

If a flat tire occurs along a desolate stretch of highway and the motorist is not physically able to operate a standard mechanical jack and manual lug wrench to change the tire, they might be forced to walk for help or risk damaging the wheel rim while driving slowly along the shoulder of the road. Such a situation may be particularly dire for handicapped and or older individuals who may lack the physical strength necessary to operate these manual tools. Moreover, manually removing lug nuts that were previous tightened with an industrial impact wrench may be physically challenging for any individual.

While calling emergency road service personnel to change the flat tire may resolve the problem, this option is often costly to the vehicle owner and usually results in significant delays. At the very least, the motorist will have their own schedule severely impacted by the delay required to have the flat tire changed.

Motor vehicle (automobiles, trucks, buses and the like) tire replacement apparatus typically include a manually actuated air jack and a manual tire wrench. A tire and wheel assembly is replaced by placing the air jack below a chassis of the motor vehicle, manually pumping the jack to raise the motor vehicle such that the tire and wheel assembly does not touch the ground and may be removed. A motorist uses the tire wrench to loosen a set of lug nuts that retain the wheel to bolts on an axle. Removing the lug nuts from the bolts enables removal of the wheel and tire assembly. The defective wheel and tire assembly wheel is removed and replaced with a new assembly. The lug nuts are replaced onto the bolts and tightened to secure the replacement assembly.

The present method and apparatus for changing a tire require significant manual labor and require the motorist to carry several separate tools in a motor vehicle at all times.

Wheel replacement requires the motorist to exit the vehicle for an extended period of time and manually remove and replace lugs on a wheel, which is not always feasible or convenient. In some cases, the motorist may not have the tools or expertise necessary to replace a wheel when necessary. Calling an auto repair service to make a service call make be expensive and time consuming.

There is a need for an apparatus and method to replace a tire that requires minimal time and expertise. With such an apparatus and method, any motorist may replace a damaged tire without significant physical exertion. Further there is a need for a vehicle mounted apparatus and method for automatically replacing a tire that does not require external tools. With such an apparatus and method, any motorist may replace a damaged tire whenever necessary anywhere and at any time.

There are a number of vehicle mounted hydraulic car lifts for changing a vehicle tire. Representative lift systems are disclosed in U.S. Pat. No. 5,722,641, titled "Vehicle Mounted Tire Changing System," to Martin et al.; U.S. Pat. No. 6,991,221 B 1, titled "Automatic Jacking System for an Automotive Vehicle," to Rodriguez; and U.S. Pat. No. 8,424,848 B 1, titled "Vehicle Jack for Use on Vehicles to Change Tires and for Other Purposes," to Hawkins, Jr. Each of U.S. Pat. Nos. 5,722,641; 6,991,221 and 8,424,848 B1 is incorporated by reference herein in its entirety.

SUMMARY OF THE DISCLOSURE

In accordance with one aspect of the disclosure, an automatic tire replacement apparatus has a hydraulic fluid line with a first end and a second end. The first end is connected to a hydraulic fluid reservoir via a reservoir actuator and the second end is connected to a hydraulic fluid retainer. At least one hydraulic piston is provided that has a hollow barrel with an inner volume and an outer volume, a piston, and a piston rod with a first end and a second end within the inner volume of the hydraulic piston. The apparatus also contains a power rod that is at least partially within the outer volume of the hollow barrel. The hollow barrel is connected to the hydraulic fluid retainer via an inner piston actuator on the inner volume and an outer piston actuator on the outer volume. The power rod has a first end, a second end and spiral thread. The first end of the power rod is connected to the second end of the piston rod. A power bolt that has a set of inward facing pins engaging the spiral thread and the second end of the power rod.

In accordance with another aspect of the disclosure, there is provided an automatic tire replacement apparatus that has an electric motor having a drive shaft and a first gear concentrically connected to the drive shaft where the first gear connects to a symmetrical array of bolt locking gears and directional gears. Each bolt locking gear rotates in the same direction that the first gear rotates. Each bolt locking gear has a cylindrical hole at its center, the cylindrical hole is outlined with an inner spiral thread which connects to a set of power bolts. Each power bolt is outlined in an outer spiral thread which may interlock with the inner spiral thread of the bolt locking gears such that rotation of any gear in the apparatus may require or cause rotation of the other gears in the apparatus.

3

Figure 2:
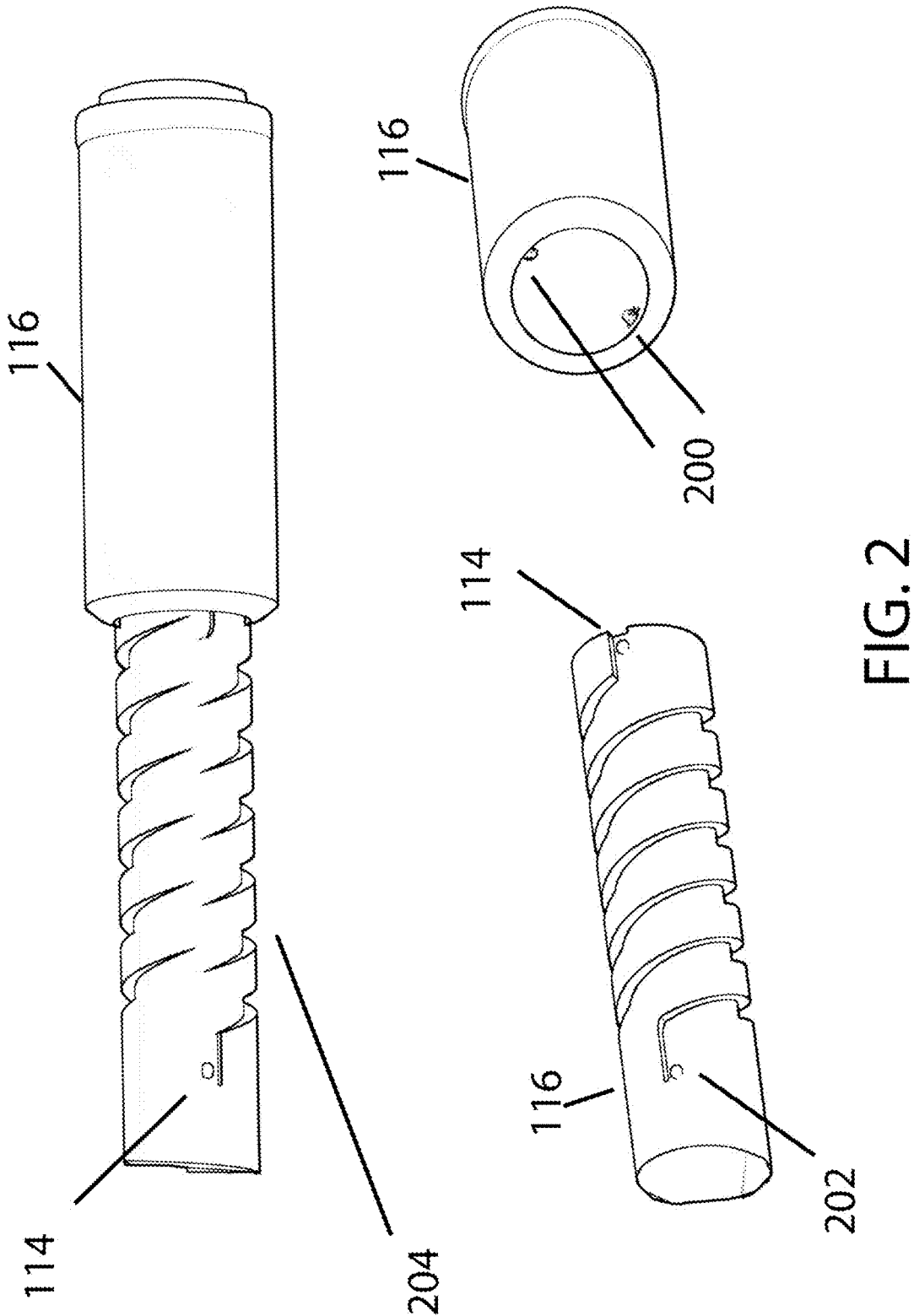

FIG. 2 illustrates a threaded power bolt with locking pins and a threaded power nut with retractable pins configured to engage the threaded power bolt.

Figure 3:
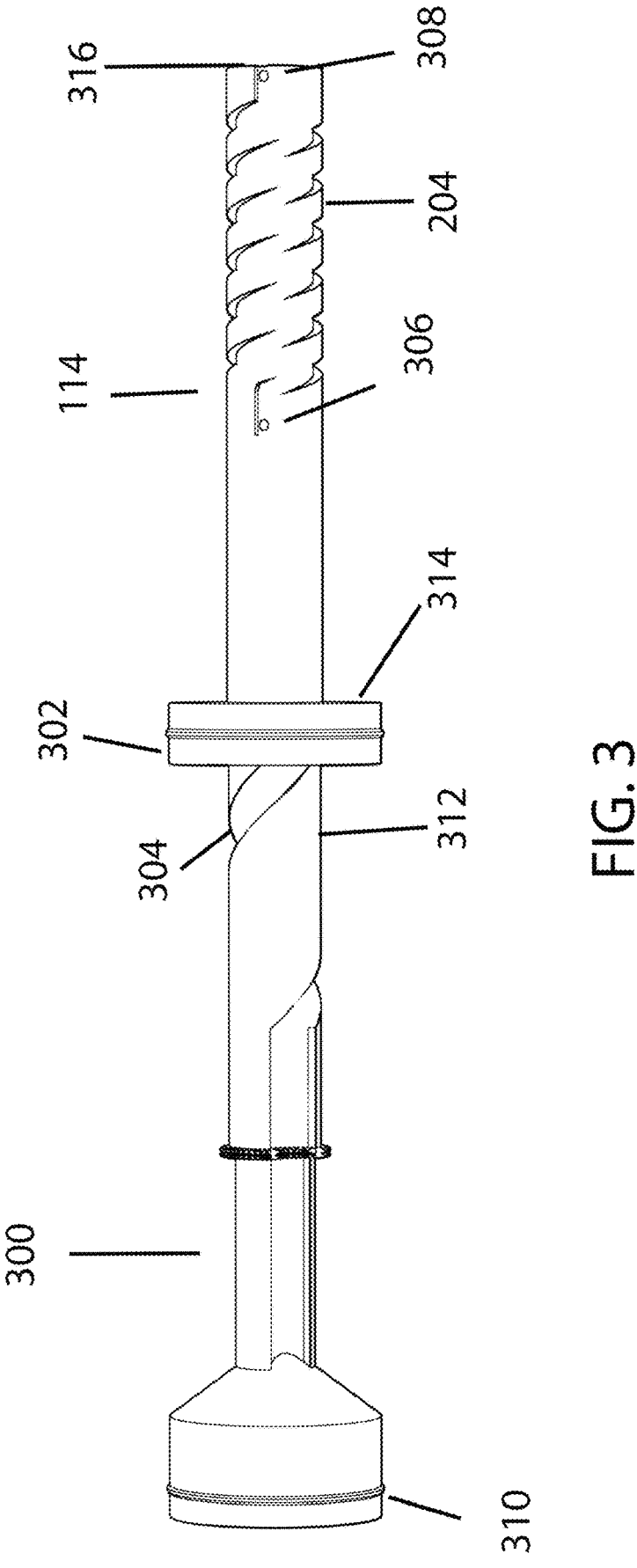

FIG. 3 illustrates a cross-sectional view of the piston rod, piston, and power rod.

Figure 4:
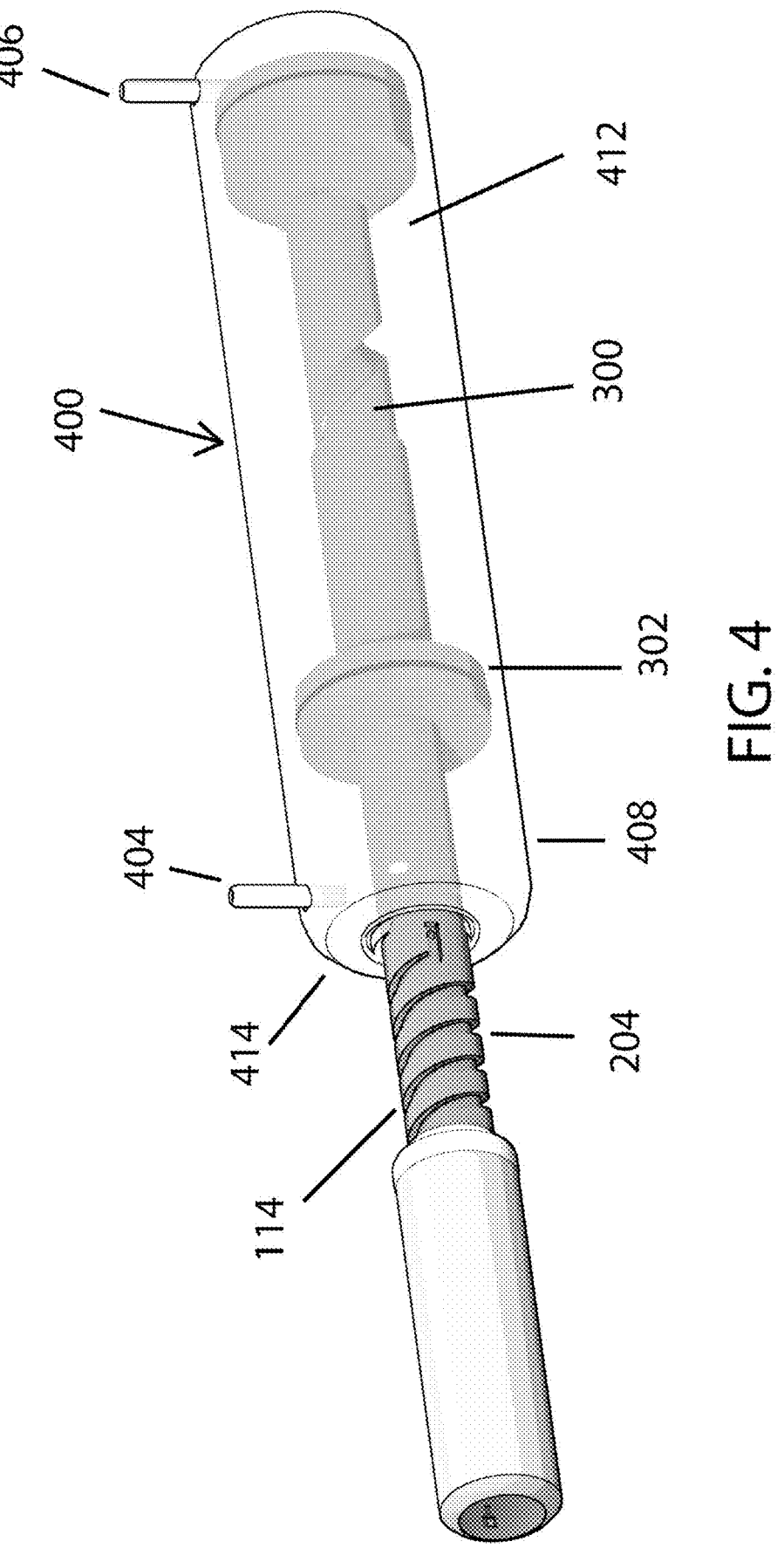

FIG. 4 illustrates a perspective cut away view of the hydraulic piston and the power rod.

Figure 5:
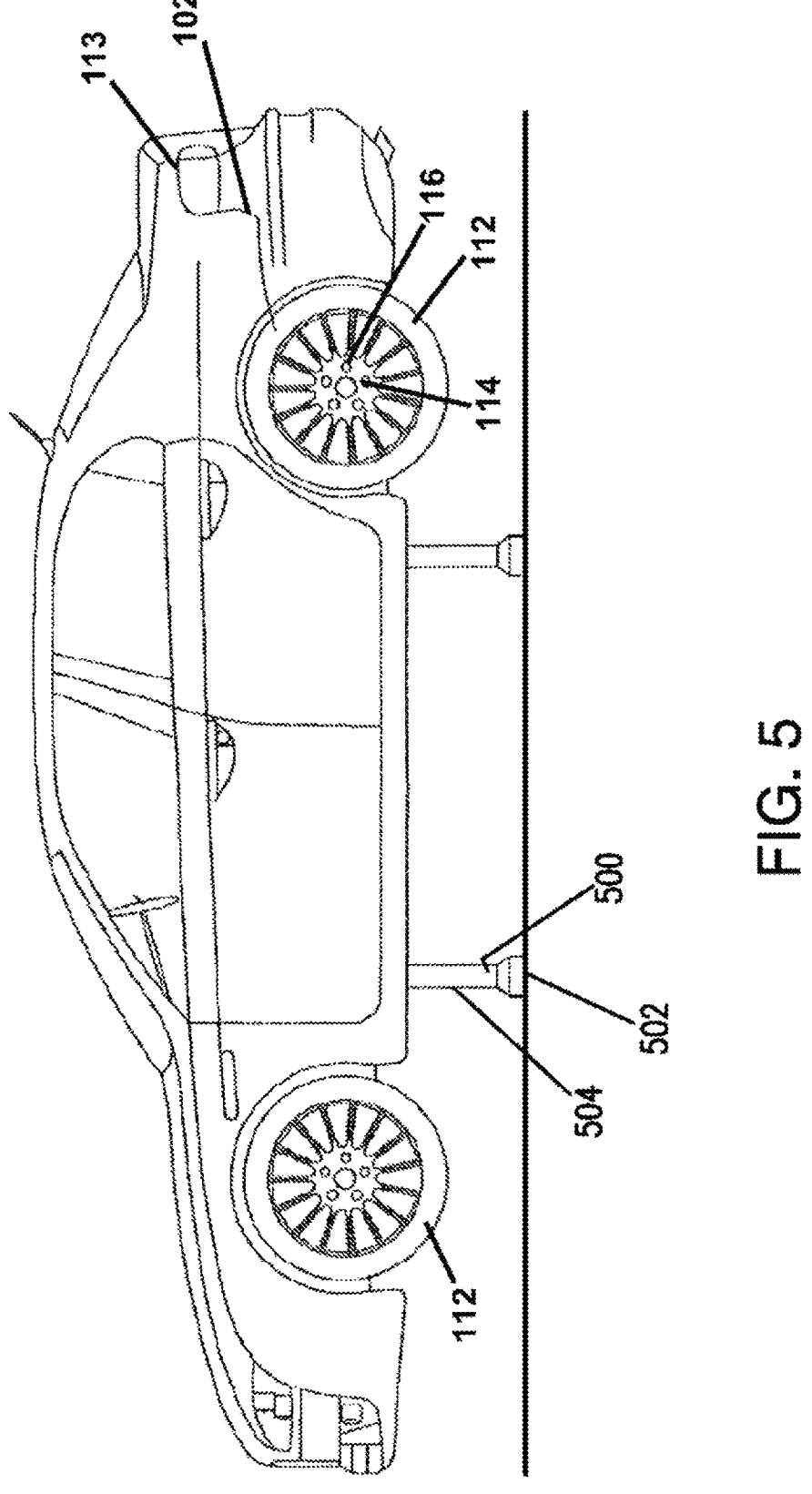

FIG. 5 illustrates a cross-sectional view of a car with the automatic lift system installed and extended.

Figure 6:
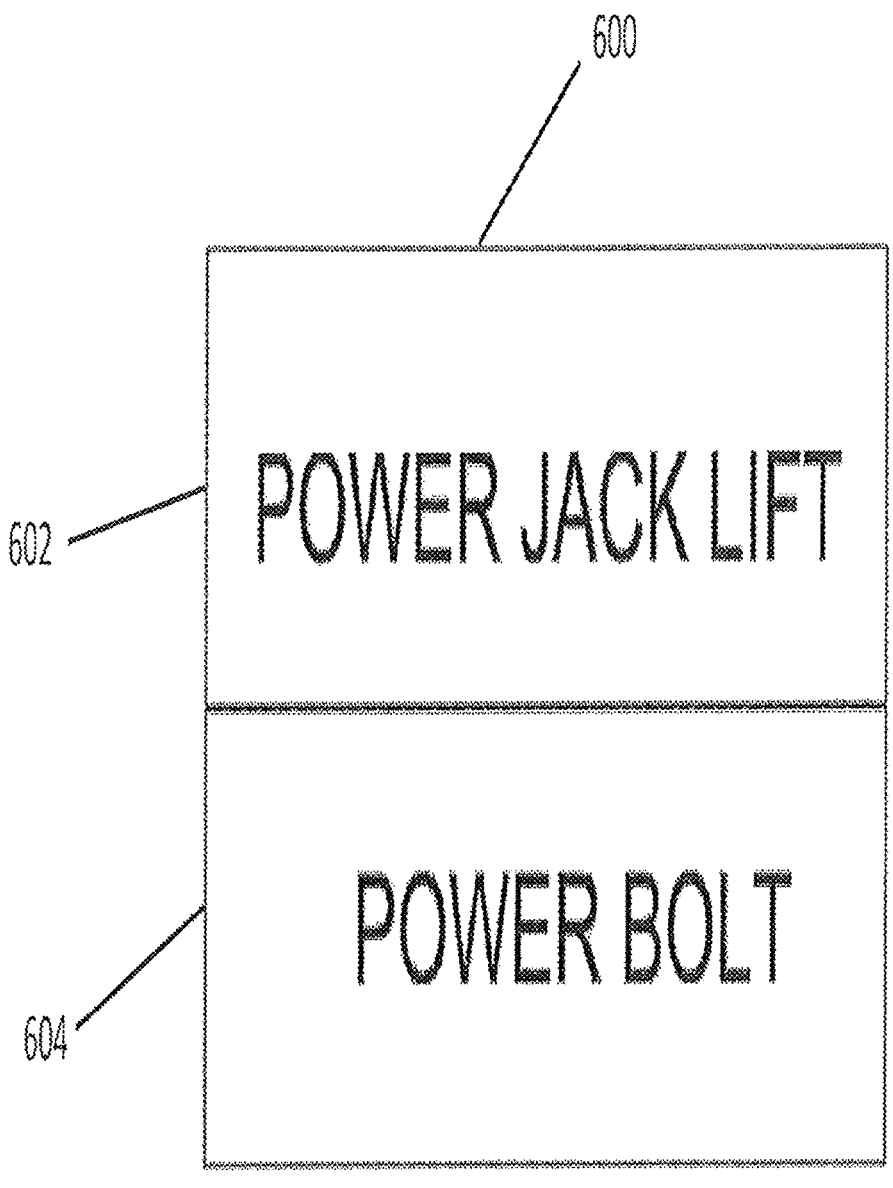

FIG. 6 illustrates a touch screen used to control functions of the apparatus for automatically replacing a tire.

Figure 7:
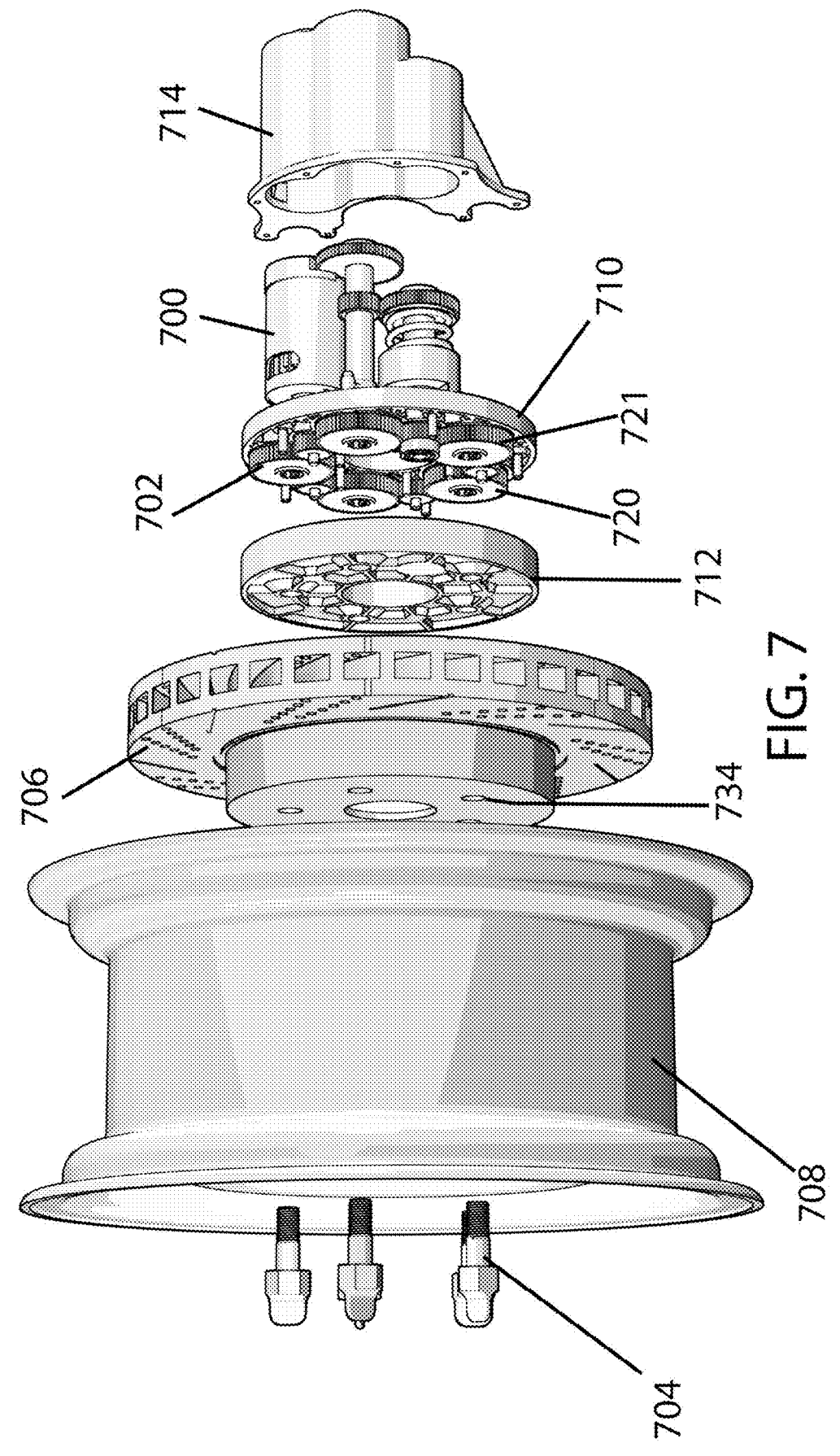

FIG. 7 illustrates in exploded perspective exploded view of an electrically actuated embodiment of the automatic tire replacement apparatus.

Figure 8:
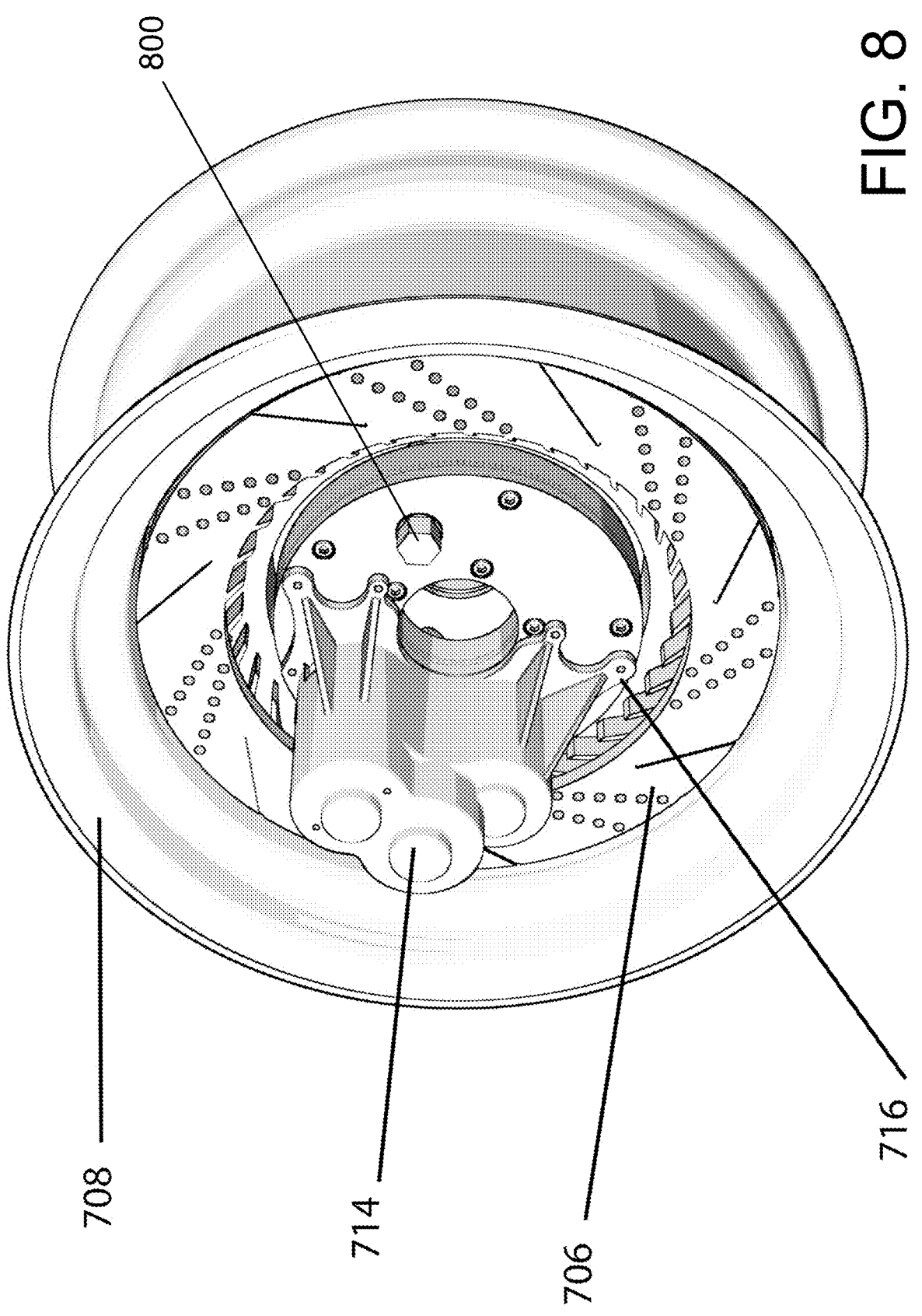

FIG. 8 is a rear perspective view of the electrically actuated embodiment of the automatic tire replacement apparatus mounted to a vehicle wheel, showing the accessibility of a quick-release lug nut.

Figure 9:
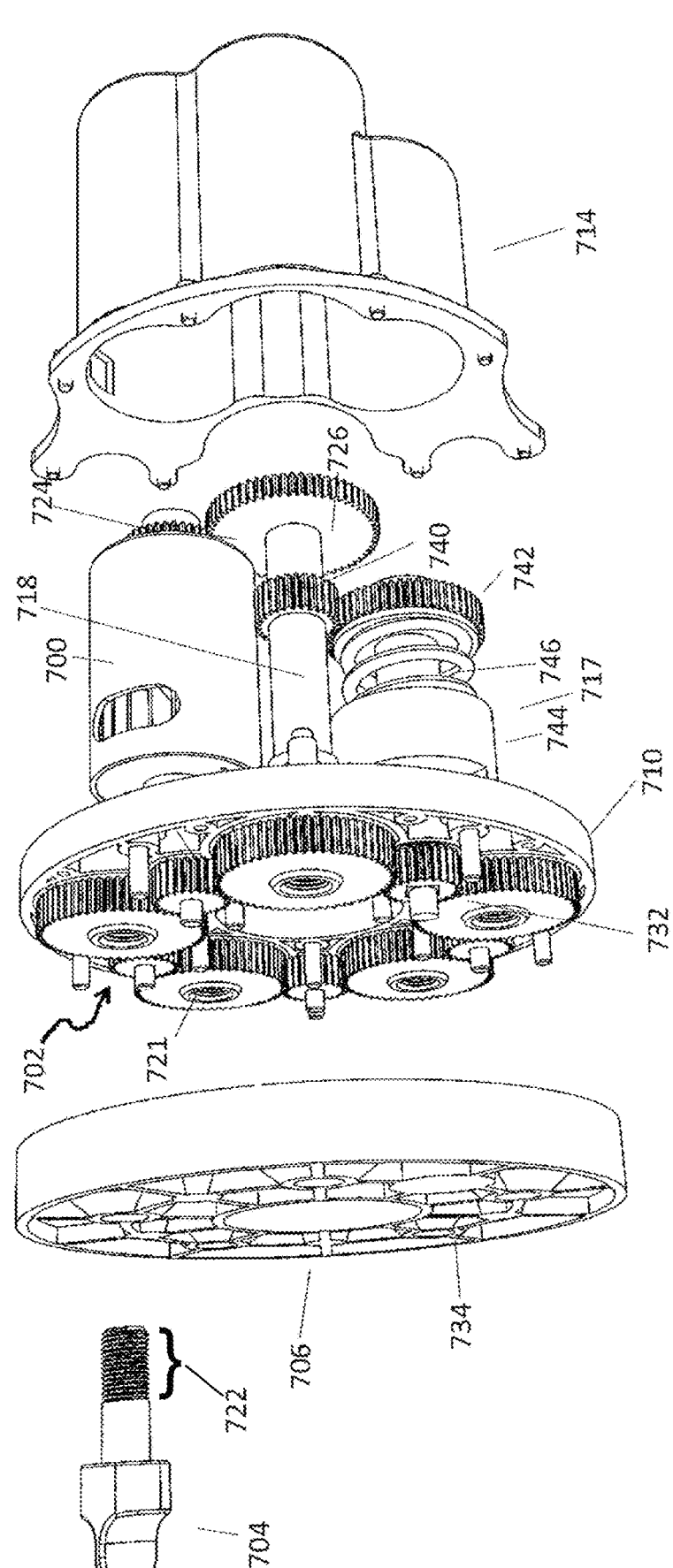

FIG. 9 illustrates is a cutaway view of the electrically actuated embodiment of the automatic tire replacement apparatus.

Figure 10:
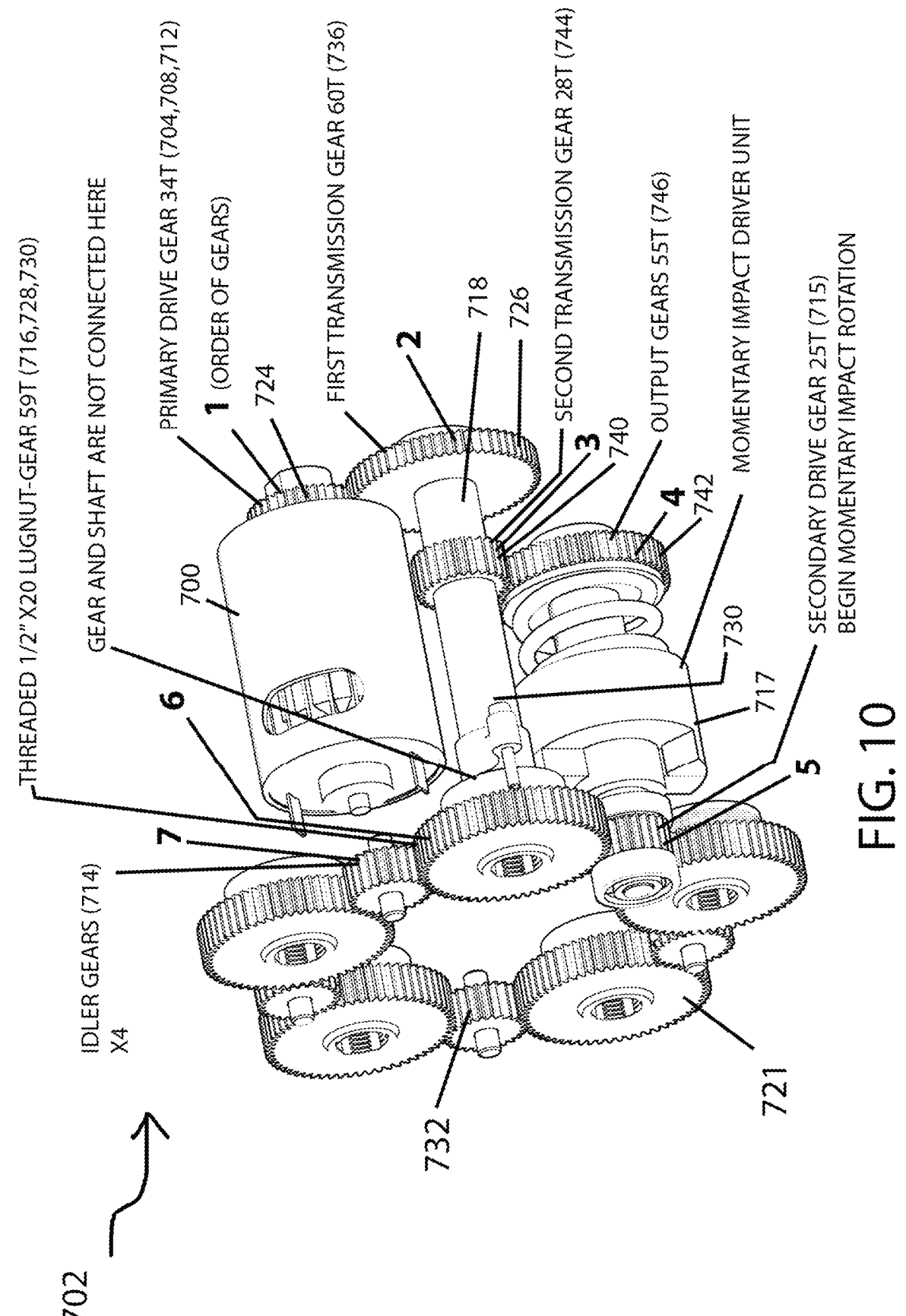

FIG. 10 illustrates in perspective view a gear arrangement for the electrically actuated embodiment of the automatic tire replacement apparatus.

Figure 11:
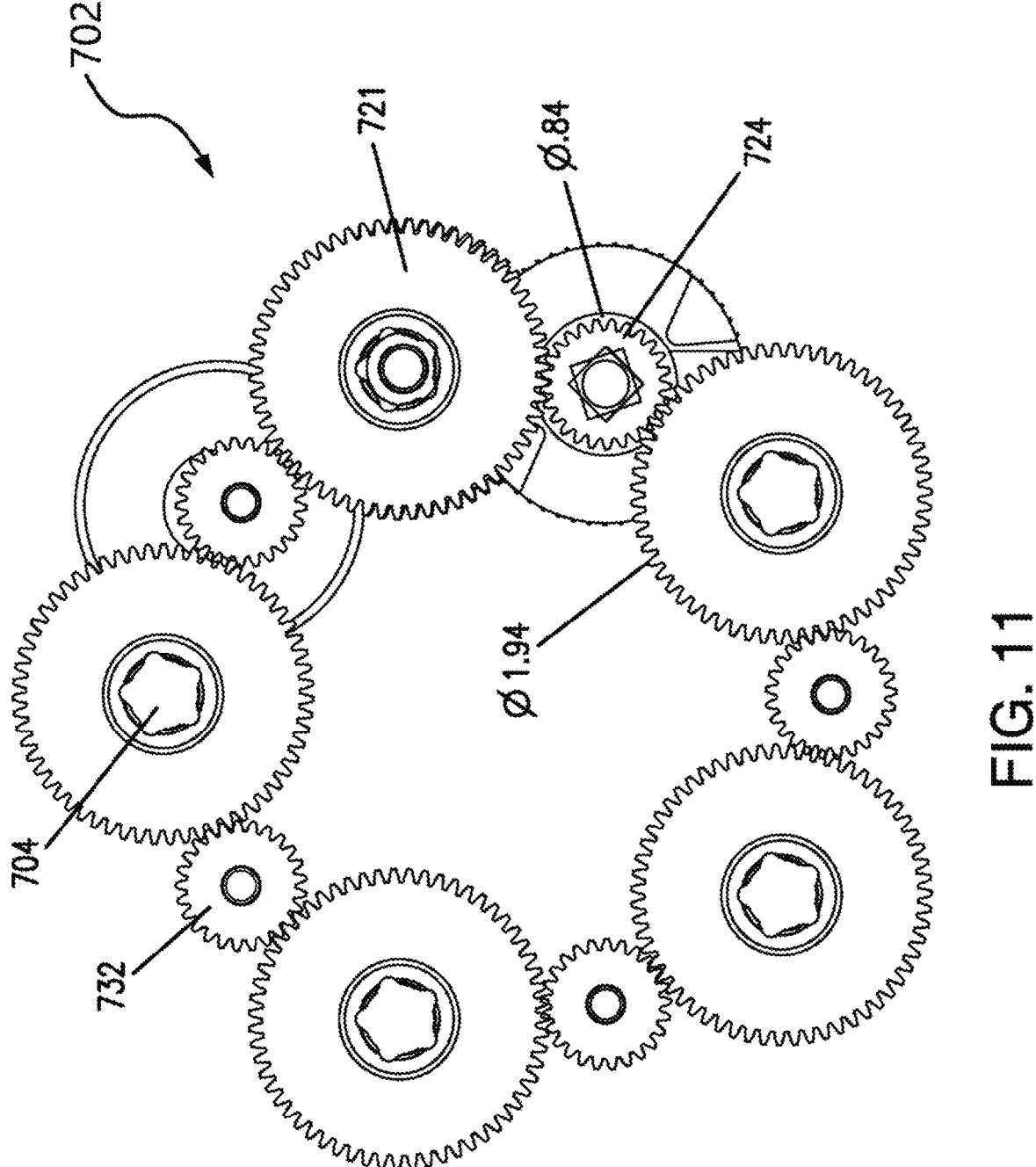

FIG. 11 is a top view of a planetary gear train for the electrically actuated embodiment of the automatic tire replacement apparatus.

Figure 12:
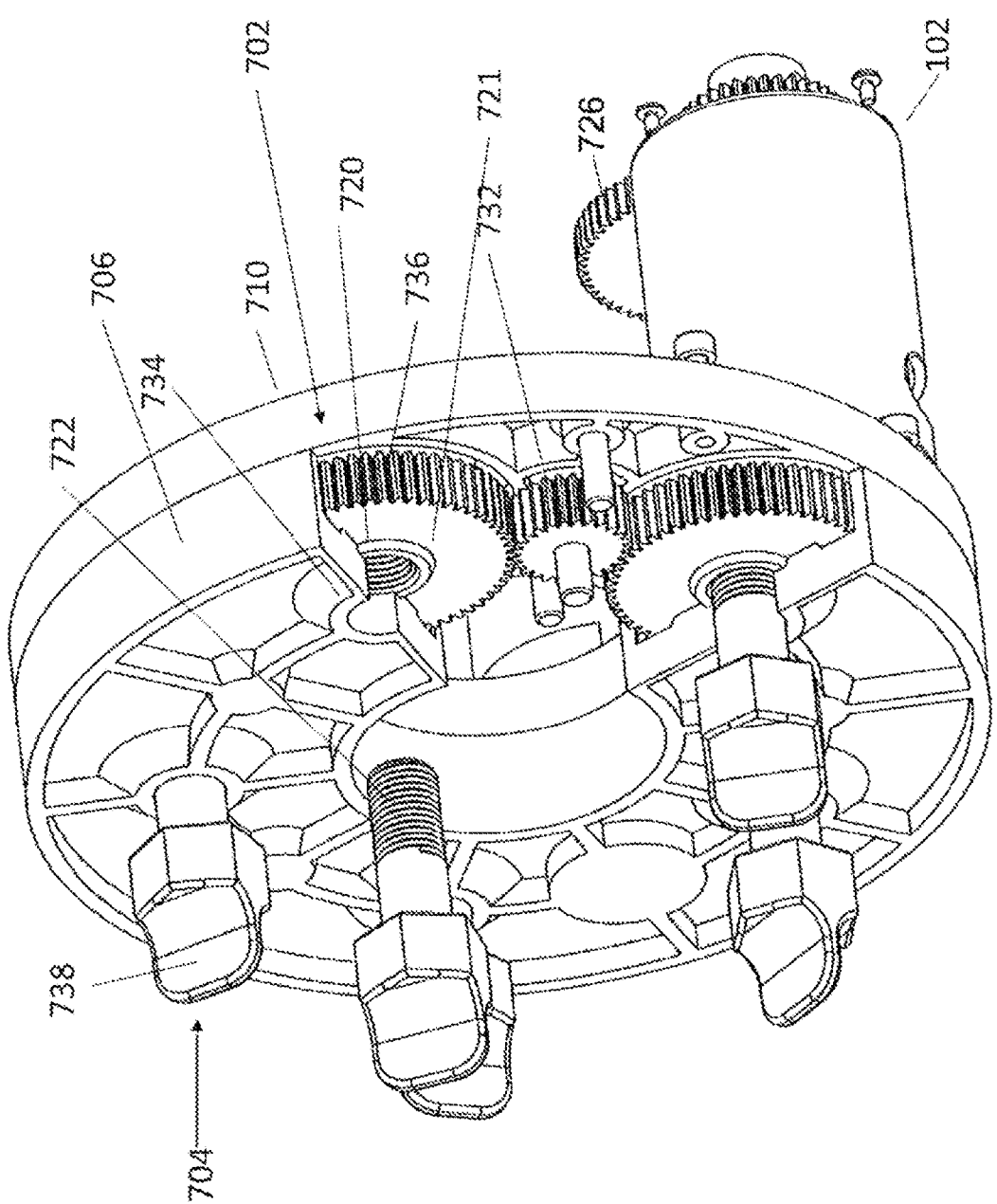
Figure 13:
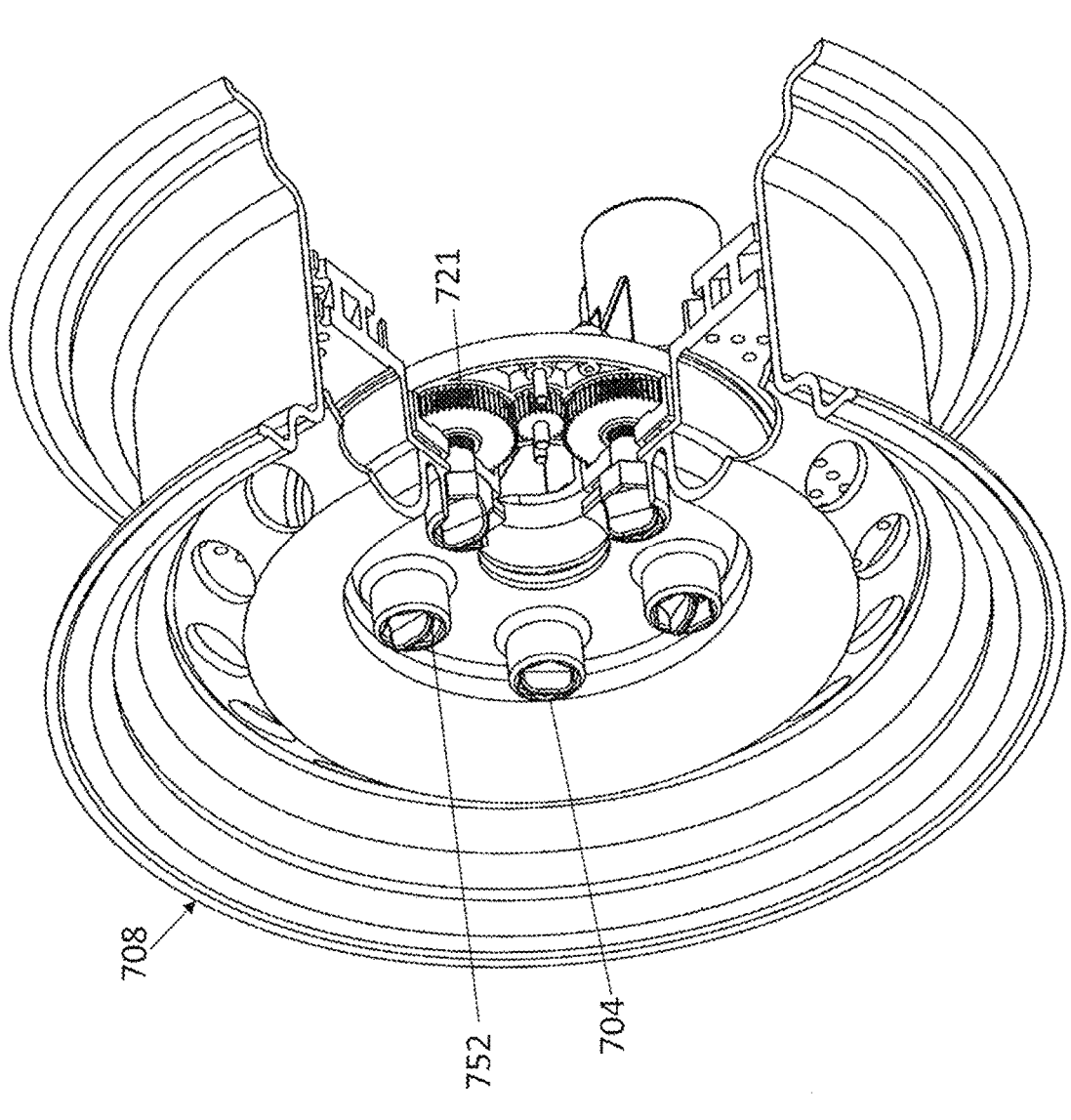

FIG. 12 is a partially broken perspective view of the gear arrangement for the electrically FIG. 13 illustrates a partially broken perspective view of the electrically actuated embodiment of the automatic tire replacement apparatus mounted to a vehicle wheel.

Figure 14:
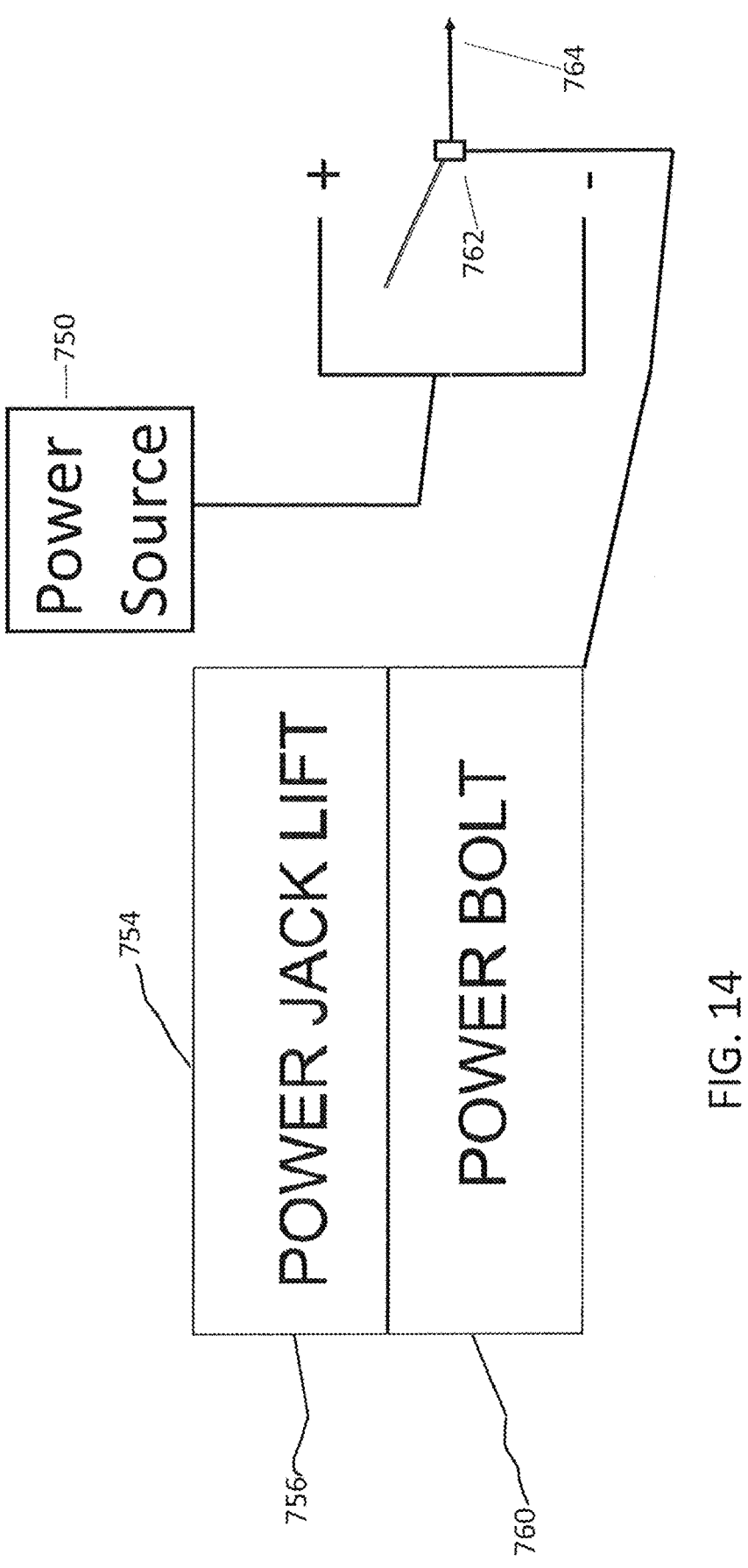

FIG. 14 schematically illustrates an actuation system for the electrically actuated embodiment of the automatic tire replacement apparatus.

Figure 15:
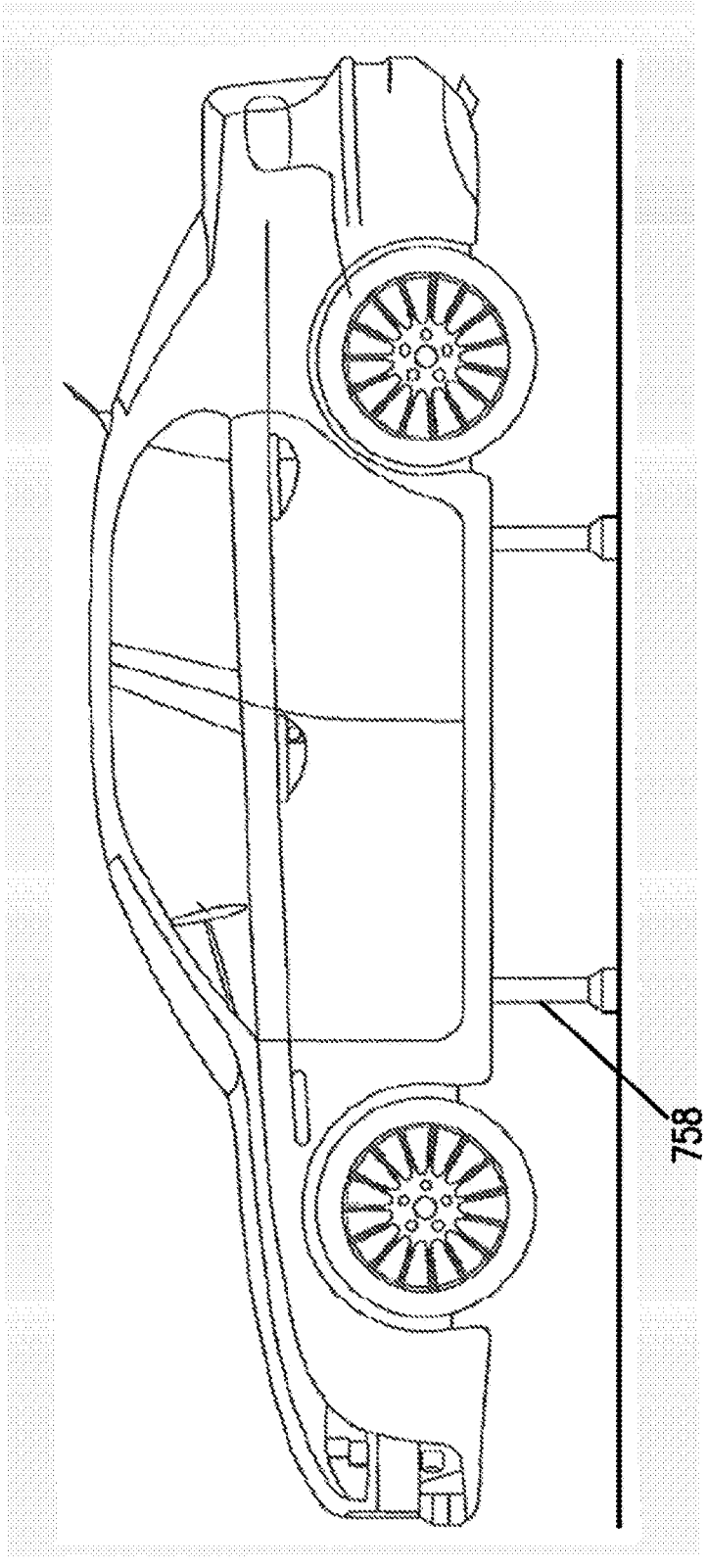

FIG. 15 is a side-perspective view of an automobile raised on a hydraulic jack system.

Figure 16:
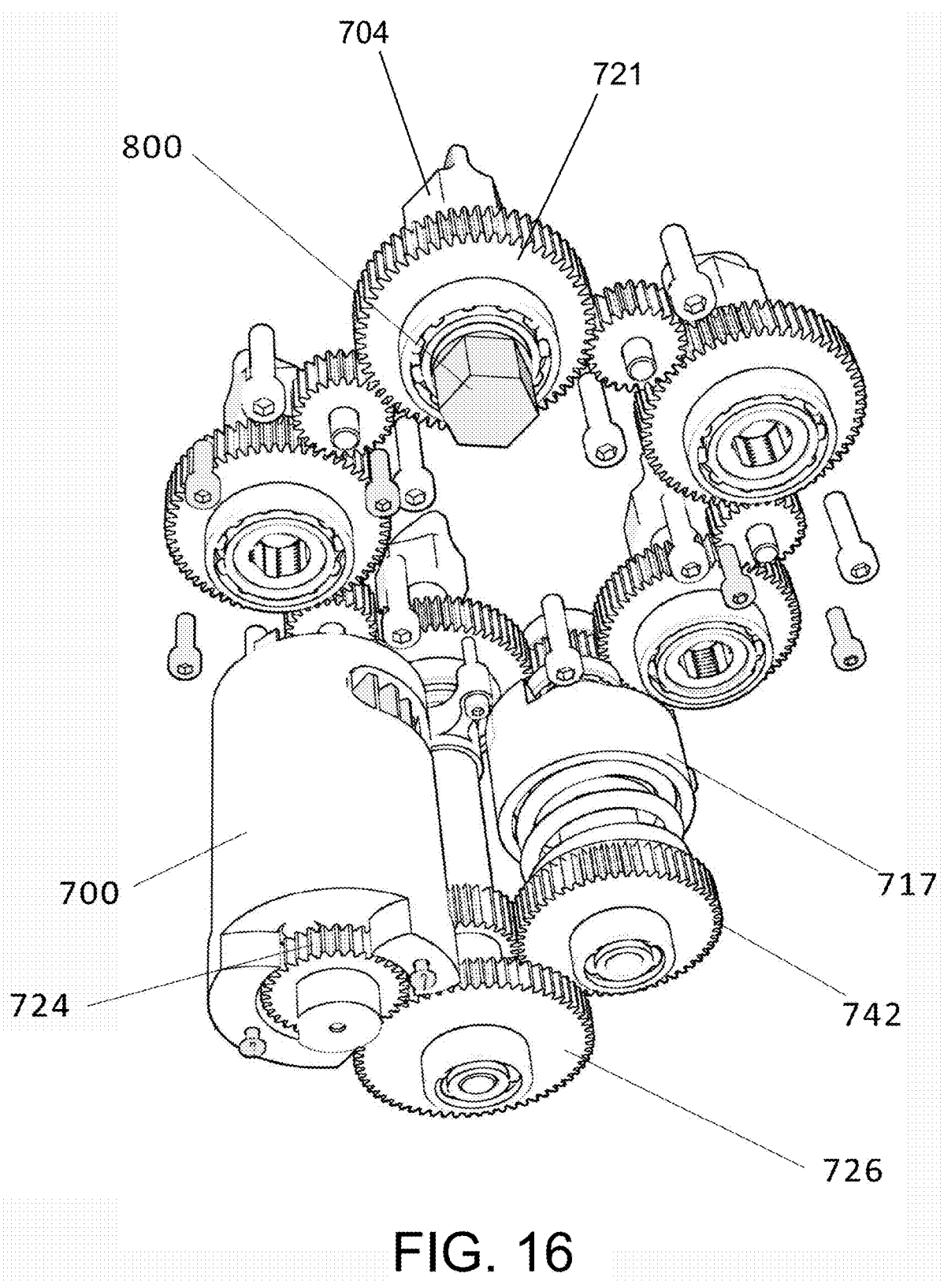

FIG. 16 is a rear perspective view of the planetary gear train and motor assembly, showing how the manual quick-release lug bolt engages with the bolt locking gears.

Figure 17:
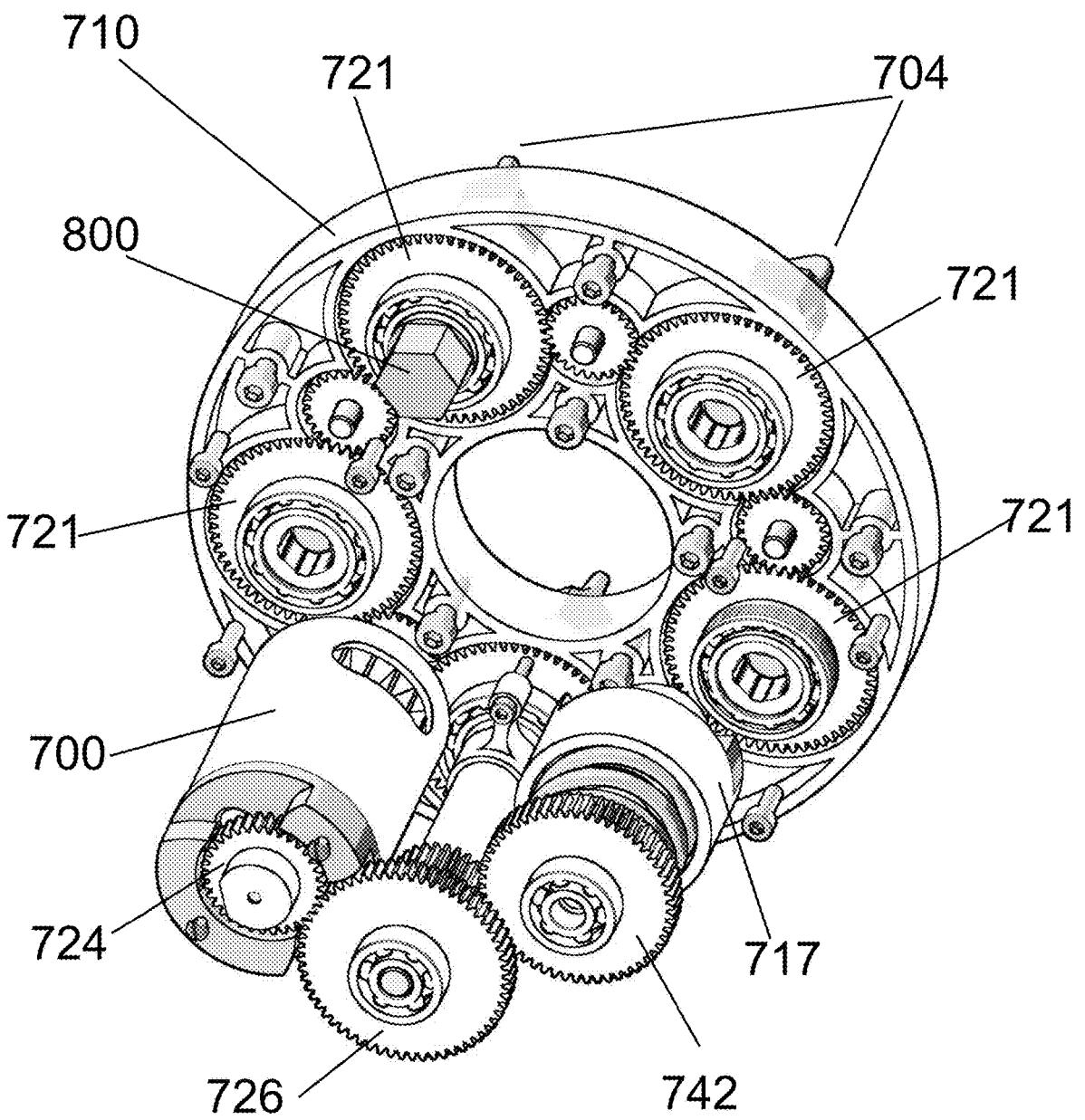

FIG. 17 is rear perspective view of the planetary gear train and motor assembly of FIG. 16, secured to a motor housing support.

Figure 18:
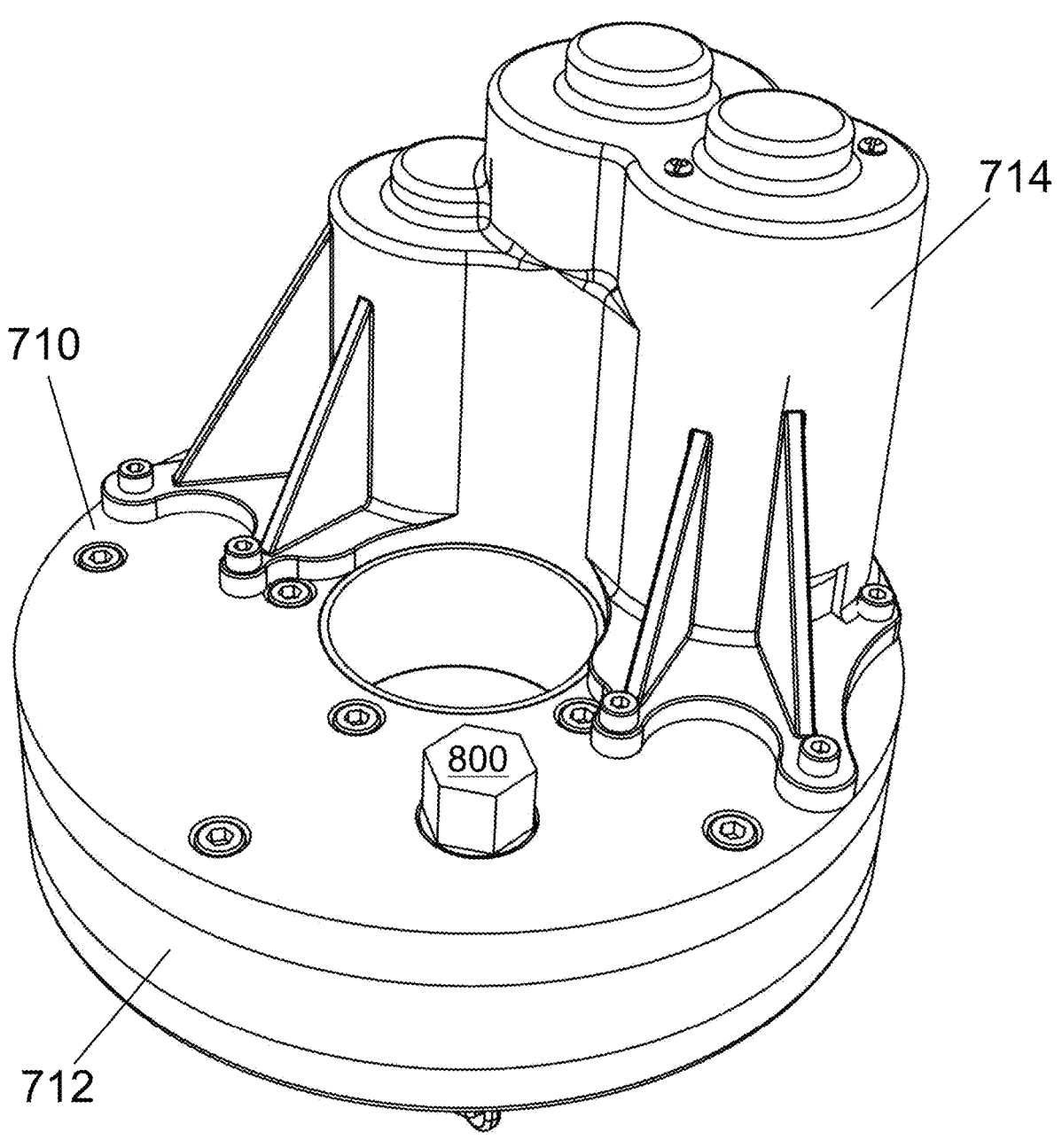

FIG. 18 illustrates a protective apparatus cover fitted over the electric motor assembly and attached to the motor housing support of FIG. 17, with the quick-release lug bolt remaining readily accessible to a user.

Figure 19:
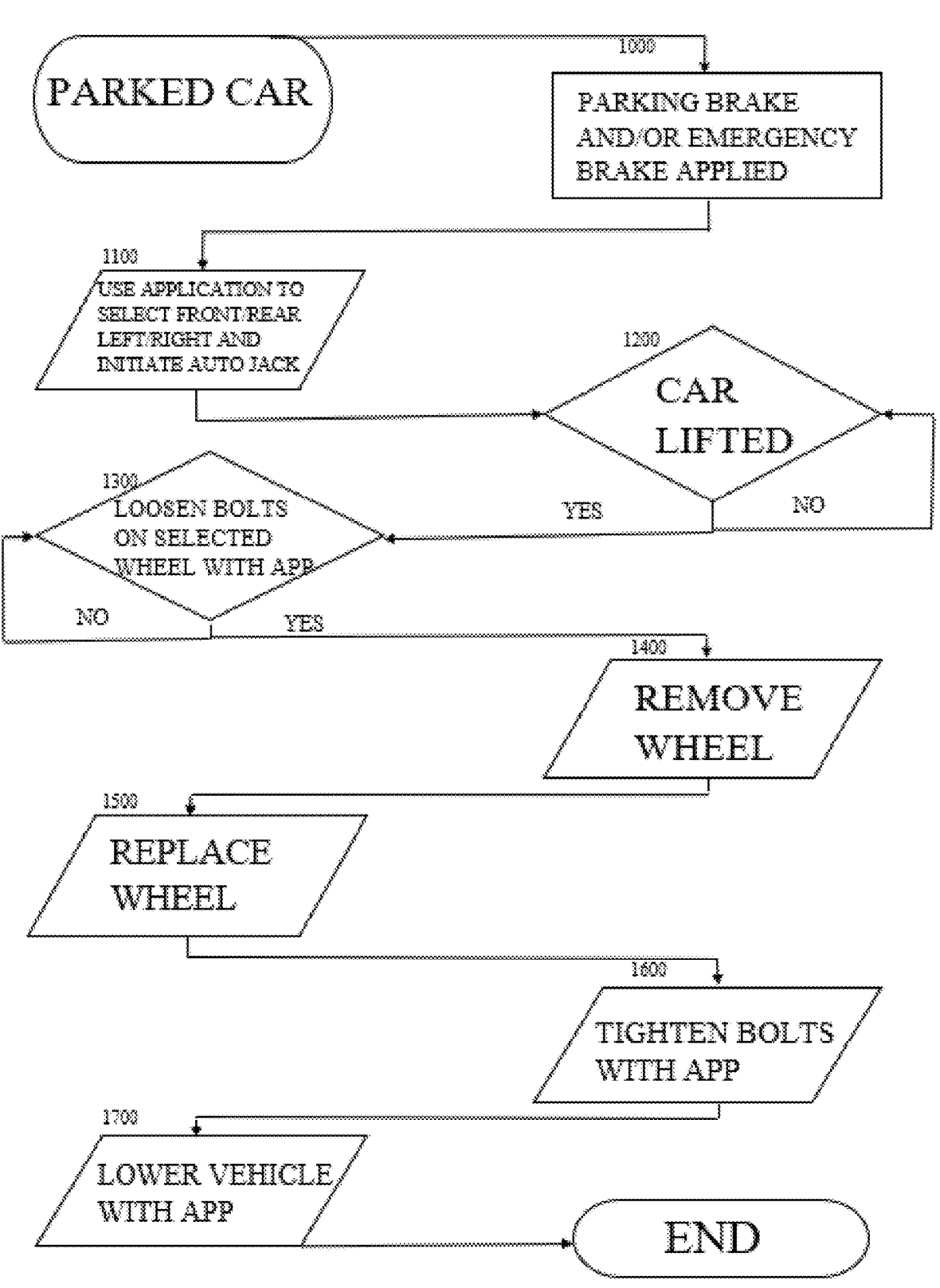

FIG. 19 is flowchart of the operational flow when the autojack app is activated.

Figure 20:
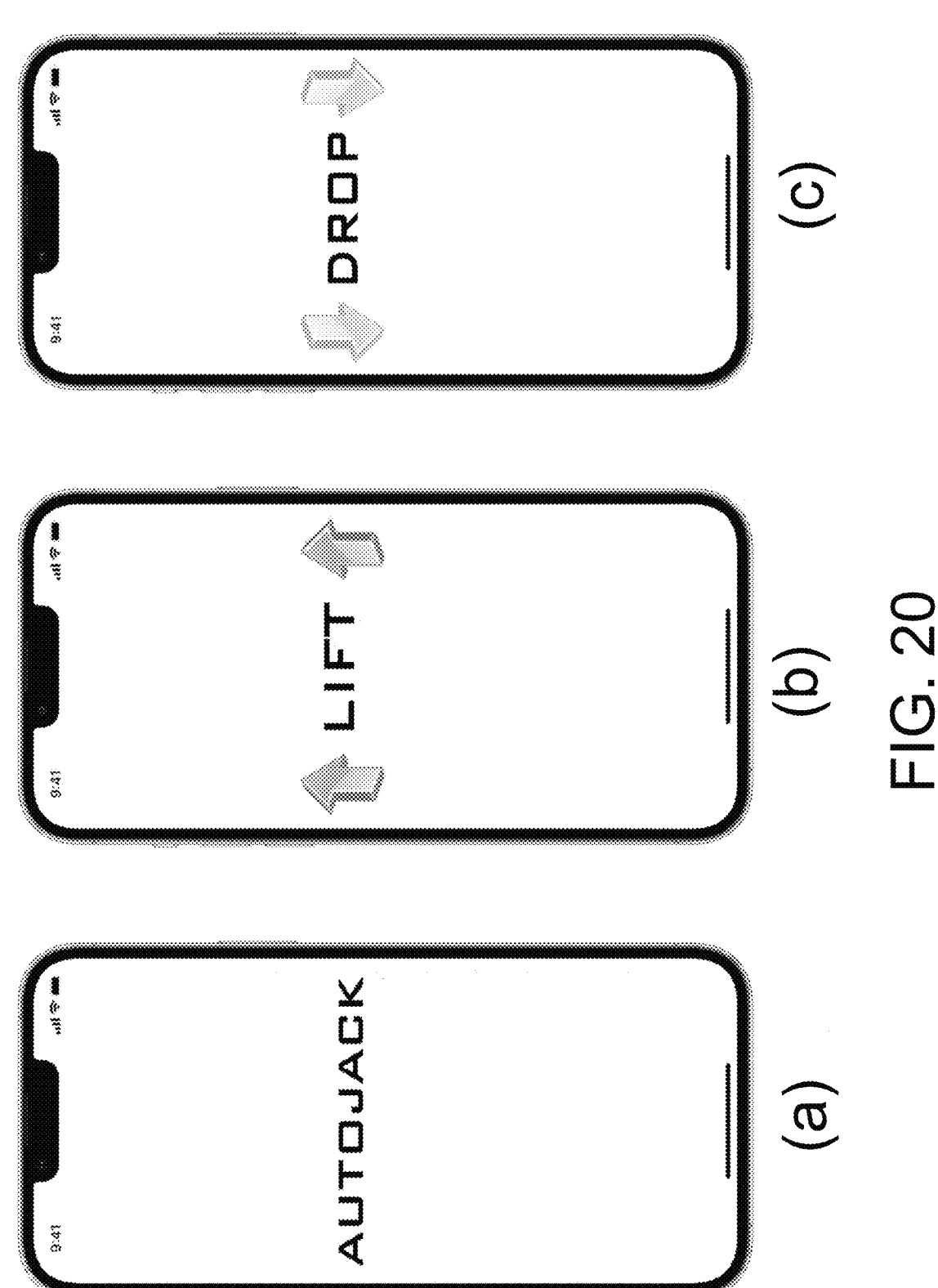

FIGS. 20(*a*)-(*c*) are exemplary screenshots of graphical user interfaces for the autojack app to raise (FIG. 20(*b*) and lower (FIG. 20(*c*)) the vehicle.

Figure 21:
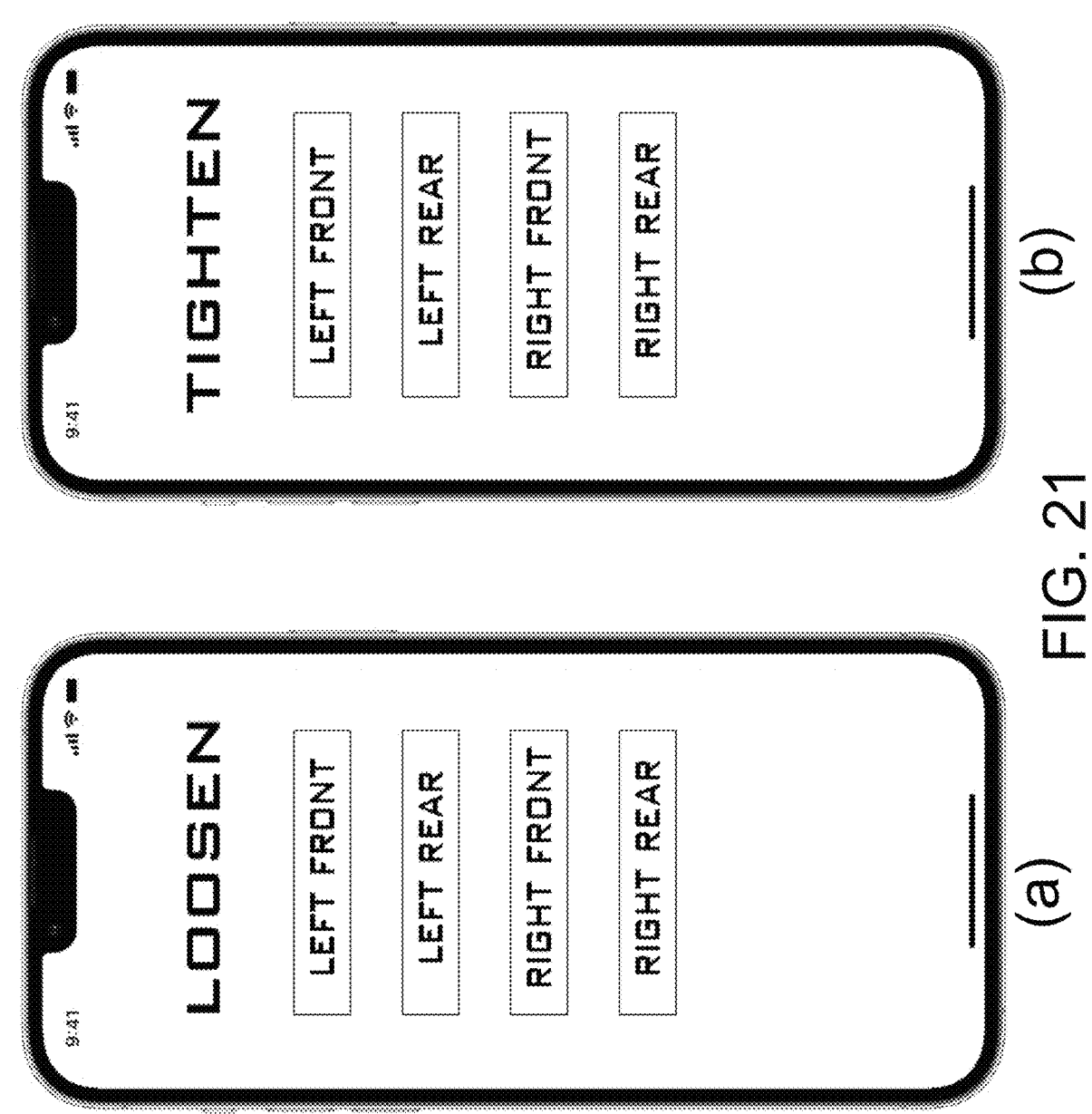

FIGS. 21(*a*)-(*b*) are exemplary screenshots of graphical user interfaces for loosening (FIG. 21(*a*)) and tightening (FIG. 21(*b*)) the power bolts of a wheel.

DETAILED DESCRIPTION

An apparatus and method for automatically replacing a tire are described below.

Figure 1:
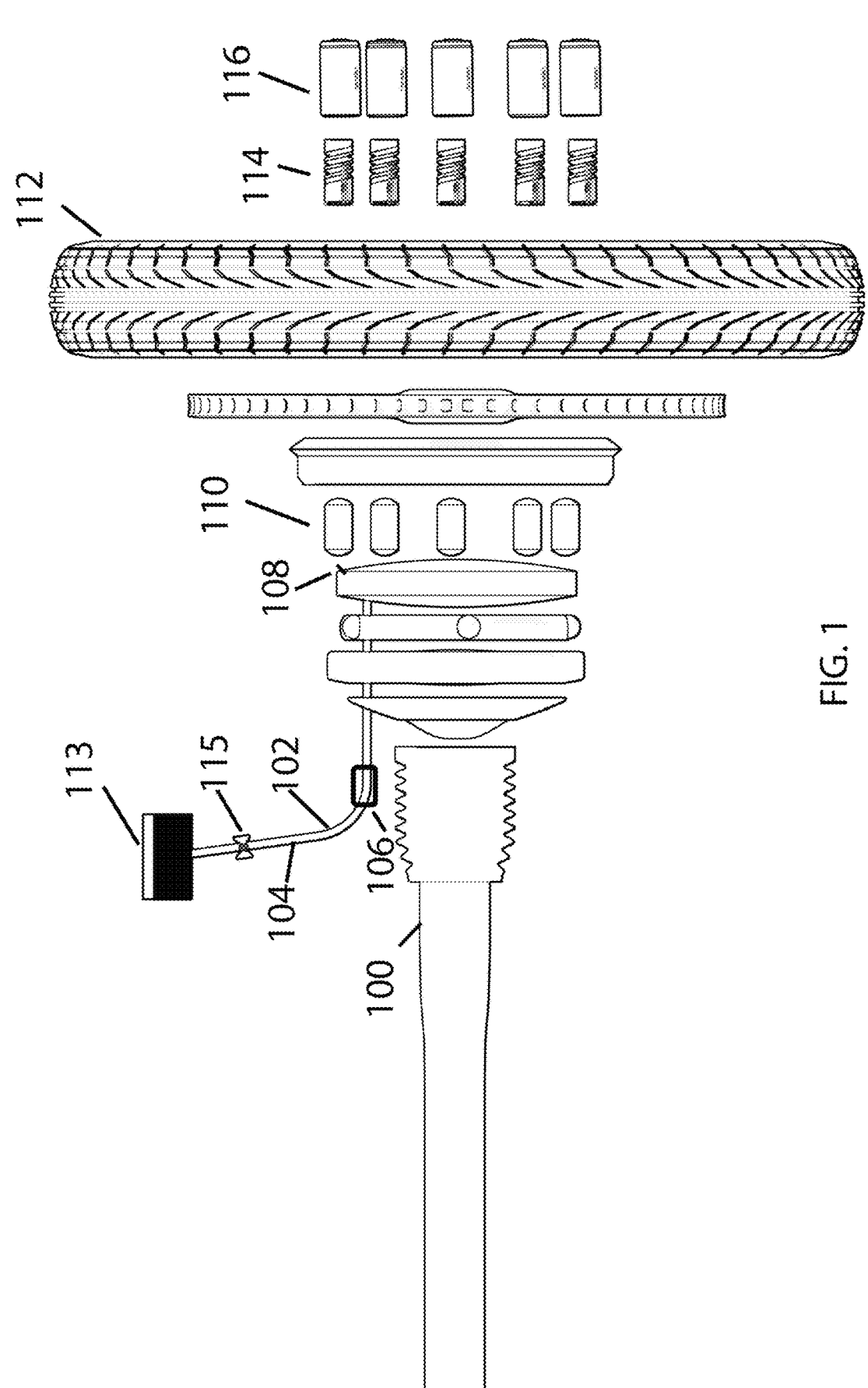
FIG. 1 schematically illustrates in cross-sectional exploded view a hydraulically actuated embodiment of an automatic tire replacement apparatus and associated car elements.

FIG. 1 illustrates in a cross section an axle 100 for a vehicle. The vehicle is typically a transportation vehicle, such as a passenger automobile, truck or bus. A hydraulic fluid line 102 having a first end 104 and a second end 106 connects to a hydraulic fluid retainer 108 and to a plurality of hydraulic pistons 110. The hydraulic pistons are symmetrically arranged around an axis of a wheel 112. An exemplary number of pistons is five. The wheel 112, a set of five power rods 114 and a set of five power bolts 116 are aligned with the hydraulic pistons 110. The hydraulic fluid line 108 connects at the first end 104 to hydraulic fluid reservoir 113 that includes an actuator 115. Opening actuator 115 inputs hydraulic fluid into the automatic tire replacement apparatus. Further the hydraulic fluid reservoir 113 and the hydraulic fluid retainer 108 include actuators that control the flow of the hydraulic fluid. In embodiments, the apparatus for automatically replacing a tire may be actuated electronically using a user input device such as a touch screen monitor, as shown in FIG. 6, or manual controls.

FIG. 2. illustrates an embodiment of a power rod 114 connected to a power bolt 116, and illustrates the power bolt w116 with inward facing locking pins 200 extended. In embodiments, inward facing locking pins 200 are extended and retracted by a locking button 202 on the power bolt 116. In embodiments the locking pins 200 are used to engage the power bolt 116 to the power rod 114 and may be manually disengaged to remove the power bolt 116 from the power rod 114. Further, when the power bolt 116 is held in a rotationally stationary position, the relative horizontal movement of a power rod 114 with a spiral thread 204 creates rotational movement effective to fasten a power rod 114 to a power bolt 116.

FIG. 3. illustrates an embodiment of a piston rod 300 having a first end 310 and a second end 312, a piston 302, and a power rod 114 having a first end 314 and a second end 316. In embodiments the piston rod may include a piston rod thread 304 that may be utilized similarly to the spiral thread 204. In embodiments the power rod 114 may include an outer lock notch, 308 and an inner lock notch 306, where a power bolt 116 may engage with the power rod spiral thread 204 via power bolt locking pins 200. In embodiments hydraulic fluid pressure may be applied to the piston 302 in either direction to translate the piston rod 300 and power bolt 116 in a horizontal direction. In embodiments, if the piston rod thread 304, or the spiral thread are engaged with a stationary object the power bolt and the piston rod may rotate as they are translated horizontally.

FIG. 4. illustrates an embodiment of a power rod 114 connected to a hydraulic piston 400 having a hollow barrel 414, a piston 302 a piston rod 300, an inner volume 412, an outer volume 408 an inner piston actuator 406 and an outer piston actuator 404. In embodiments, the inner piston actuator 406 may release hydraulic fluid into the inner volume 414 to act on the piston 302 and move the piston rod 300 and the power rod 114 outwardly in a horizontal direction while the outer piston actuator 404 may simultaneously release hydraulic fluid from the outer volume 408 into the hydraulic fluid retainer. Similarly in embodiments, the outer piston actuator 404 may release hydraulic fluid into the outer volume 408 to act on the piston 302 and move the piston rod 300 and the power rod 114 inwardly while the inner piston actuator 406 may release hydraulic fluid from the outer volume into the hydraulic fluid retainer. Hydraulic fluid may be any fluid capable of being pressurized including oil and air.

FIG. 5. illustrates a car with an extended automatic power jack 500. In embodiments the automatic car jack may comprise four bases 502 that collapse into the chassis of a vehicle. The bases may be pressurized by hydraulic fluid to extend outwardly from the chassis and elevate a motor vehicle. In embodiments a jack 500 may include an extending body 504 and a base 502. In embodiments the power jack 500 may be activated to lift a motor vehicle such that the tires no longer touch the ground, and the power jack 500 may be deactivated to lower a motor vehicle such that the tires touch the ground.

FIG. 6 illustrates a touch screen 600, or other control system with options to actuate the power jack lift 602 or the power bolt 604.

FIG. 7 is an exploded perspective view of an embodiment of an apparatus for automatically replacing a tire that is actuated by an electric motor 700 that drives a planetary gear train 702 that engages power bolts 704. The power bolts 704 extend through apertures 734 in platen 706 and gear housing cover 712 to engage threaded apertures 720 extending into bolt locking gears 721 thereby holding wheel 708 in place. The electric motor 700 is configured to rotate the gears of the planetary gear train 702 in both a clockwise direction and a counterclockwise direction. In this way, the power bolts may be loosened to remove the wheel 708 or tightened when the wheel 708 is replaced.

The electric motor 700 produces a torque sufficient to secure and release the power bolts 704. This torque is generally between 125 foot pounds and 175 foot pounds and preferably between 144 foot pounds and 173 foot pounds. The motor housing support 710, gear housing cover 712 and platen 706 are formed from a corrosion resistant material, such as cast magnesium, an aluminum alloy, steel, treated steel and a steel alloy. Further corrosion resistance is provided by an apparatus cover 714 that may be formed from a rigid plastic, anodized aluminum alloy or other corrosion resistant material.

FIG. 8 is a perspective view showing the apparatus encased within apparatus cover 714 affixed, such as by plurality of bolts 716, to platen 706 that is adjacent an inner wall of the wheel 708.

FIG. 9 is a perspective view illustrating the electric motor 700 engaging drive shaft 718 to rotate the gears of the planetary gear train 702. A threaded aperture 720 extends into the center of each bolt locking gear 721 that engages the threads 722 of a power bolt 704. Depending on the direction of rotation of the bolt locking gears 721, the power bolt 704 will either loosen or tighten. The electric motor also engages a transfer cylinder 717 that controls the amount of tightening and loosening of power bolts 704.

The gearing system is further illustrated in FIG. 10. The electric motor 700 transfers rotational motion to a primary drive gear 724 that engages a first transmission gear 726 affixed adjacent a first end 728 of the drive shaft 718. Rotation of the primary drive gear causes rotation of the first transmission gear thereby rotating drive shaft 718. An opposing second end 730 is affixed to one of the bolt locking gears 721 such that rotation of the drive shaft 718 causes rotation of the bolt locking gear 721 rotating the gears of the planetary gear train 702. To achieve the desired torque and rotation to engage and disengage power bolts, the bolt locking gears 721 have an exemplary diameter that ranges between 1.5 inches and 2.5 inches and is preferably between 1.9 inches and 2.0 inches. Each bolt locking gear 721 nominally has 60 gear teeth. Idler gears 732 provide proper spacing for the bolt locking gears and transfer rotational motion to an adjacent bolt locking gear. These idler gears have an exemplary diameter between 1.0 and 1.5 inches and preferably between 1.2 inches and 1.3 inches. Projecting from the outer edge of the idler gears 732 are, for example, 34 gear teeth.

Referencing FIGS. 11 and 12, the primary drive gear 724 engages a bolt locking gear 721 that is an element of the planetary gear train 702. Each bolt locking gear 721 has a diameter of between 1.5 inch and 2.0 inch and a preferred diameter of between 1.9" and 2.0". Each bolt locking gear nominally has 59 gear teeth. The planetary gear train 702 has sufficient bolt locking gears 721 to engage each power bolt 704. For a passenger automobile, that is typically between four and six bolt locking gears 721. The planetary gear train 702 also includes idler gears 732 positioned between bolt locking gears 721 so that the bolt locking gears 721 align with through holes 734 extending through platen 706. The power bolts 704 extend through the through holes 734 of the platen 706 and engage the threaded apertures 720 formed in bolt locking gears 721. The idler gears 732 have a diameter ranging between 0.5 inch and one inch and preferably between 0.8" and 0.9". The directional gears nominally have 25 gear teeth.

The bolt locking gears 721 may be seated in cylindrical recess 736 formed in motor housing support 710. The motor housing support 710 may be a disk having a diameter that ranges between 5 inches and 8 inches and is preferably between 6" and 7". The motor housing support 710 in combination with the platen 706 is sized to encapsulate the planetary gear train 702.

Each bolt locking gear 721 includes a threaded aperture 720 having a diameter and thread pitch effective to receive and engage the threaded portion 722 of a power bolt 704. Both the diameter and thread pitch may be English units or metric units dependent on manufacturer. Nominally, the diameter of the threaded aperture is between 0.4 inch and 0.6 inch, and preferably, that diameter ranges between 0.45" and 0.55" with the spiral thread formed on the wall of the bore 720. The power bolts 704 with a bolt spiral thread 722 interlock with the spiral thread in each threaded aperture 720. Each power bolt 704 may also have a power bolt cap 738, which may be shaped in a rigid geometrical shape such as a standard tire lug nut shape to enable removal with a conventional lug wrench if electric power is not available or unsafe to use. For example, if the vehicle battery has been damaged in an accident. In some embodiments, each power bolt 704 may be made at least partially of magnetic material and have a magnetic tip.

Returning to FIGS. 9 and 10, primary drive gear 724, which may have a diameter that ranges between one inch and 1.5 inches and preferably between 1.2" and 1.3", nominally has 34 gear teeth. The primary drive gear 724 engages first transmission gear 726 on the drive shaft 718. The primary drive gear 724 is operatively connected to a second transmission gear 740 that engages an output gear 742 that drives momentary impact drive 717.

The second transmission gear 740 drives the output gear 742 which may have a diameter that ranges between 0.5 inch and 1.5 inches and is preferably between 0.9" and 1.0 inch and nominally has 28 gear teeth. The output gear 742 is connected to the primary impact drive transfer 717 and is concentrically connected to a locking cylinder 744 encasing a locking coil 746. The locking coil 746 has a number of windings that typically ranges between 3 and 6. During tightening of the power bolts 704, the locking cylinder 744 rotates until an edge of the locking coil 746 contacts a stop that may be grooves that interlock with the locking coil 746 preventing overtightening of the power bolts 704.

The electric motor 700 drives the planetary gear train 702 in either a clockwise or a counterclockwise direction, rotating the bolt locking gears 721, to either tighten or loosen the power bolts 704. Alternatively, the electric motor may be able to reverse direction of rotation or it may turn in one direction and different gearing arrangements be engageable to control the direction of rotation of the locking gears 721. The electric motor 700 also drives rotation of the locking coil 746 to stop rotation of the bolt locking gears 721 at the point of power bolt 704 tightening to prevent overtightening. The electric motor 700 is also connected to a power source 750 as also shown in FIG. 14.

FIG. 13 illustrates the apparatus for automatically replacing a tire mounted to a wheel 708. Five power bolts 704 are illustrated passing through apertures in the wheel 708 and engaging bolt locking gears 721. Power bolt caps 752 are optionally disposed on a surface of the wheel 708, such that each power bolt 704 fits into the power bolt cap 752 when engaged with a bolt locking gear array 721. The power bolt caps 752 hold each power bolt 704 in place, allowing the power bolt 704 to only translate toward and away from its respective bolt locking gear 721. The power bolt caps 752 make manual removal of the power bolts 704 more difficult as a theft deterrent.

As an additional safety feature, a manual quick-release lug bolt 800 may be provided to allow removal of a wheel 708 in case electric power is unavailable for use, such as if the battery becomes damaged or its charge is depleted, and the electric motor 700 is unable to release the power bolts 704. As can be seen in FIGS. 16 and 17, the lug bolt 800 threads into the rear side of one of the threaded apertures 720 of the bolt locking gears 721. The lug bolt 800 may have an outer diameter (width across flats) of $^{11}/_{16}$ (117 mm) to accommodate a correspondingly sized lug wrench of $^{11}/_{16}$ (17 mm). In other embodiments, the diameter of the lug bolt 800 and the size of the lug wrench may differ according to such factors as the weight load of the vehicle. Manually rotating the lug bolt 800 with such a lug wrench or equivalent causes the bolt locking gears 721 of the planetary gear train 702 to rotate and thereby loosen, or tighten, the power bolts 704. In this way, if electric power is unavailable, a user will still be able to change one or more wheels on the vehicle by using a lug wrench and reaching behind the wheel to rotate the lug bolt 800 and loosen the power bolts 704.

FIG. 18 shows that the manual quick-release lug bolt 800 remains easily accessible by a user even when the planetary gear train is covered by the motor housing support 710 and the electric motor 700 is covered by the apparatus cover 714.

FIG. 14 illustrates a touch screen 754 to control the automatic tire replacement apparatus. The touch screen 754 may be a display on the vehicle dashboard of an application on a separate device, such as smart phone or personal computer communicating with the automatic tire replacement apparatus by a known wired or wireless protocol. The touch screen 754 may display a lift control 756 to activate a power jack 758 mounted inside the vehicle (FIG. 15). The touch screen 754 may also display a power bolt control 760 controlling the loosen and tighten the power bolt functions. FIG. 14 further schematically illustrates the touch screen 754 communicating with an electric switch 762 configured to provide either positive or negative voltage from the power source 750 to an input 764 to the electric motor 700 (FIG. 9). The power source 750 may be a battery or generator on the vehicle. Alternative, the power source 750 may be an external power source separate from the car power system. The electric switch 752 may be engaged with a positive voltage or a negative voltage from the power source 750 effective to rotate the electric motor in a clockwise direction or a counterclockwise direction.

In addition, or as an alternate, to the touch screen 754 control, an autojack and wheel replacement app may be provided as a download to a mobile device such as a user's smartphone. Operation of this app will be described below with reference to FIGS. 19-21 in the case where a user desires to change a flat tire.

Here, we presume that the motorist user of a vehicle having a flat tire has pulled off to the side of a road and parked at a safe location that does not impede other traffic. The user also has shifted the vehicle's transmission to "Park" if automatic transmission, and has engaged the emergency brake. As an added safety measure, it is recommended that the user also turn on the vehicle hazard lights. At this time, the user should switch on the vehicle's hydraulic power (hydraulic power take-off ("hydraulic PTO")) and exit the vehicle while holding the mobile device running the autojack app.

FIG. 19 shows the basic flow of the app's operation. At a preliminary step 1000, the app checks that vehicle is parked with the parking brake and/or emergency brake engaged. The app will also check that the vehicle is parked on a substantially level surface and will not operate if the slope of the underlying surface exceeds an upper limit. Depending on factors such as the weight of the vehicle, the shape and stability of the feet of the jack, the upper limit may be set to approximately four degrees. Needless to say, other embodiments may be configured to safely operate on steeper slopes. In certain embodiments the app may also check that the underlying surface is not slippery, i.e. not wet or covered in snow or ice, and is sufficiently dense to support the jacks that will lift the vehicle.

At step 1100, the user activates the autojack app shown in FIG. 20(a) and selects "Lift", shown in FIG. 20(b), to specify that the hydraulic autojack will operate to raise the vehicle, and the user also selects the particular wheel (front/rear and left/right) to be changed (see FIG. 21(a)). Note, that in certain other embodiments the "Lift" operation may be carried out first, and then the particular wheel for replacement may be selected.

The app then activates the hydraulic jack system to lift the vehicle (step 1200). This process will begin lifting the vehicle by synchronously descending all four jacks from the undercarriage of the vehicle. If the vehicle does not lift, likely due to a soft underlying surface, the app will return an error message to the user to suggest moving the vehicle to a more suitable site if possible.

If the app detects that the hydraulic system has engaged and the vehicle is raised to a suitable height, the app will then activate the electric motor 700 to loosen the power bolts 704 on the pre-selected wheel (step 1300). The app acknowledges when the power bolts 704 have been loosened appropriately. The user shall again press on the center top of each power bolt to fully release and detach each power bolt from its hydraulic piston cylinder rod.

The user may then safely and easily remove the selected wheel and replace it with a spare wheel, mounting the spare wheel onto the wheel hub (step 1500). At this time, the user shall reinsert each power bolt 704 back into its respective hydraulic piston cylinder. Next the app activates the electric motor 700 to tighten power bolts 704 on the selected wheel (step 1600). Finally, the user will select "Drop", shown in FIG. 20(c), to activate the hydraulic autojack to retract the four powered jacks into the undercarriage and lower the vehicle (step 1700). At this time, the user may enter the vehicle, turn off the app, and switch off the hydraulic PTO system.

With the faulty wheel now replaced with a spare, and the faulty wheel stored safely inside the vehicle, the user may turn on the vehicle engine, turn off the hazard lights, release the emergency brake, shift from "Park" to "Drive" (in the case of automatic transmission), and carefully merge into traffic.

In this manner, a user is able to control the raising/lowering of the vehicle and the tightening/loosening of power bolts all from a single app with easy-to-use graphical user interfaces.

The invention claimed is:

1. A wheel release system comprising:

a plurality of bolt locking gears arranged in a symmetrical array such that each bolt locking gear rotates in a same rotational direction, each bolt locking gear having a cylindrical through-bore at its center, a wall of the cylindrical through-bore having an inner spiral thread formed thereon;

a drive shaft connected to one of the plurality of bolt locking gears, wherein rotation of the drive shaft causes each of the plurality of bolt locking gears to rotate in the same rotational direction;

a plurality of power bolts, each power bolt having an outer spiral thread sized to interlock with the inner spiral thread of one of the plurality of bolt locking gears, each power bolt capable of being inserted through apertures in a wheel and wheel hub assembly and into the cylindrical through-bore of a respective bolt locking gear, each power bolt rotatably tightenable to interlock with the corresponding bolt locking gear and securely hold the wheel to the wheel hub assembly and rotatably loosenable to disengage said interlock and release the wheel from the wheel hub assembly, wherein the rotation of the drive shaft causes the plurality of bolt locking gears to rotate in the same direction and correspondingly tighten or loosen the interlocked state of the plurality of power bolts; and a lug release bolt having an outer lug spiral thread sized to interlock with the inner spiral thread of the through-bore of one of the plurality of bolt locking gears, the lug release bolt capable of being inserted into said through-bore from a direction opposite the insertion direction of the respective power bolt, wherein the lug release bolt, when rotated counterclockwise by an external torque, causes the array of bolt locking gears to rotate and unscrew the power bolts inserted therein and release the wheel.

2. The wheel release mechanism of claim 1, wherein the external torque applied to the lug release bolt is applied manually.

3. The wheel release mechanism of claim 2, wherein the external torque applied to the lug release bolt is applied via an $^{11}/_{16}$ inch (17 mm) size lug nut wrench.

4. A method for replacing a wheel on a vehicle comprising:

selecting, via a mobile app, a lifting operation of the vehicle by a power jack having a plurality of bases, each of the plurality of bases extendable from a collapsed position within a chassis of the vehicle to an extended position effective to elevate the vehicle, selecting, via the mobile app, one or more wheels on the vehicle to replace;

causing the mobile app to activate the plurality of bases of the power jack to raise the vehicle to a height suitable for replacing the wheel;

causing the mobile app to activate an electrical motor connected to a bolt locking gear array to rotate in a loosening direction so as to loosen a set of power bolts which secure a first wheel connected to a set of bolt locking gears in the bolt locking gear array;

manually removing the set of power bolts;

manually removing the first wheel from an axle of the vehicle;

manually placing a second wheel on the axle;

manually attaching the set of power bolts to secure the second wheel to the set of bolt locking gears in the bolt locking gear array;

causing the mobile app to activate the electrical motor to rotate in a tightening direction so as to tighten the set of power bolts with the bolt locking gears; and causing the mobile app to activate the plurality of bases of the power jack to lower the vehicle to ground or street level.

5. The method of claim 4, wherein the plurality of basis of the power jack are operated by a hydraulic fluid system.

6. The method of claim 5, wherein the hydraulic fluid is a gas.

7. The method of claim 5, wherein the hydraulic fluid is a liquid.

8. The method of claim 1, wherein the steps of selecting via the mobile app are implemented via a graphical user interface.

\* \* \* \* \*